United States Patent [19]
Coifman et al.

[11] Patent Number: 5,384,725
[45] Date of Patent: Jan. 24, 1995

[54] METHOD AND APPARATUS FOR ENCODING AND DECODING USING WAVELET-PACKETS

[75] Inventors: Ronald Coifman, North Haven, Conn.; Yves Meyer, 49 Boulevard Saint Marcel, Paris, France, 75013; Mladen V. Wickerhauser, New Haven, Conn.

[73] Assignees: Yale University, New Haven, Conn.; Yves Meyer

[21] Appl. No.: 525,973

[22] Filed: May 18, 1990

[51] Int. Cl.⁶ .................. G06G 7/00; G06F 15/31; G06F 7/38
[52] U.S. Cl. .................... 364/807; 364/724.14; 364/725; 358/426; 358/432; 367/43
[58] Field of Search ........... 364/807, 826, 715.1, 364/724.14, 724.12, 725, 728.01, 725.03, 421, 724.01–724.07; 358/261.3, 262.1, 432, 426–433; 73/625, 628; 367/38, 59, 43–51; 128/660.01

[56] References Cited

U.S. PATENT DOCUMENTS

| | | | |
|---|---|---|---|
| 4,210,931 | 7/1980 | Bailey et al. | 358/128.5 |
| 4,224,678 | 9/1980 | Lynch et al. | 364/724 |
| 4,675,750 | 6/1987 | Collins et al. | 360/9.1 |
| 4,706,499 | 11/1987 | Anderson | 73/625 |
| 4,744,028 | 5/1988 | Karmarkar | 364/402 |
| 4,807,029 | 2/1989 | Tanaka | 358/133 |
| 4,922,464 | 5/1990 | Pieprzak et al. | 367/38 |
| 4,974,187 | 11/1990 | Lawton | 364/728.01 |
| 5,000,183 | 3/1991 | Bonnefous | 128/660.01 |
| 5,014,134 | 5/1991 | Lawton et al. | 358/261.3 |

OTHER PUBLICATIONS

B. Alpert and V. Rokhlin, *A Fast Algorithm for the Evaluation of Legendre Expansions*, Yale University Technical Report, YALEU/DCS/RR–671 (1989).

J. Carrier, L. Greengard and V. Rokhlin *A Fast Adaptive Multipole Algorithm for Particle Simulations*, Yale University Technical Report, YALEU/DCSRR–496 (1986), SIAM Journal of Scientific and Statistical Computing, 9 (4), 1988.

R. Coifman and Yves Meyer, *Non–linear Harmonic Analysis, Operator Theory and P.D.E.*, Annals of Math Studies, Princeton, 1986, ed. E. Stein.

I. Daubechies, *Orthonormal Bases of Compactly Supported Wauelets*, Comm. Pure, Applied Math, XL1, 1988.

L. Greengard and V. Rokhlin, *A Fast Algorithm for Particle Simulations*, Journal of Computational Physics, 73(1), 325, 1987.

S. Mallat, *Review of Multifrequency Channel Decomposition of Images and Wavelet Models*, Technical Report 412, Robotics Report 178, NYU (1988).

Y. Meyer *Principe d'incertitude, bases hilbertiennes et algebres d'operateurs*, Séminaire Bourbaki, 1985–1986, 662, Astérisque (Socié té Mathématique de France).

Y. Meyer, *Wavelets and Operators*, Analysis at Urbana, vol. 1, edited by E. Berkson, N. T. Peck and J. Uhl, London Math. Society, Lecture Notes Series 137, 1989.

(List continued on next page.)

Primary Examiner—Stephen M. Baker
Assistant Examiner—Jim Trammell
Attorney, Agent, or Firm—Martin M. Novack

[57] ABSTRACT

The disclosure involves the use of a library of modulated wavelet-packets which are effective in providing both precise frequency localization and space localization. An aspect of the disclosure involves feature extraction by determination of the correlations of a library of waveforms with the signal being processed, while maintaining orthogonality of the set of waveforms selected (i.e. a selected advantageous basis). In a disclosed embodiment, a method is provided for encoding and decoding an input signal, such as an audio or video signal, comprising the following steps: applying combinations of dilations and translations of a wavelet to the input signal to obtain processed values; computing the information costs of the processed values; selecting, as encoded signals, an orthogonal group of processed values, the selection being dependent on the computed information costs; and decoding the encoded signals to obtain an output signal.

2 Claims, 16 Drawing Sheets

OTHER PUBLICATIONS

S. T. O'Donnel and V. Rokhlin, *A Fast Algorithm for the Numerical Evaluation of Conformal Mappings*, Yale University Technical Report, YALEU/DCS/RR-554 (1987), SIAM Journal of Scientific and Statistical Computing, 1989.

J. O. Stromberg, *A Modified Haar System and Higher Order Spline Systems*, Conference in harmonic analysis in honor of Antoni Zygmund, Wadworth math. series, edited by W. Beckner and al., II, 475-493. date unknown.

G. Schulz, *Iterative Berechnung der reziproken Matriz*, Z. Angew. Math. Mech. 13, 57-59, 1933.

A. Ben-Isreal and D. Cohen *On iterative computation of generalized inverses and associate projections*, J. SIAM Numer. Anal., v. 3, 410-419, 1966.

T. Söderström and G. W. Stewart *On the numerical properties of an iterative method for computing the Moore-Penrose generalized inverse*, J. SIAM Numer. Anal., v. 11, 1, 61-74, 1974.

G. Beylkin, *The inversion problem and applications of the generalized Radon transform*, Comm. Pure Appl. Math. v. 37, 5, 579-599, 1984.

N. Karmarkar, *A new polynomial-time algorithm for linear programming* Combinatorica, v. 4, 4, 373-395, 1984.

A. Haar, "Zur Theorie der Orthogonalen Functionsysteme", Math Annal. 69 (1910).

K. G. Beauchamp, "Walsh Functions And Their Applications", Academic Press (1975), Title Page and Table of Contents.

S. G. Mallat, "A Theory For Multiresolution Signal Decomposition: The Wavelet Representation", IEEE Transactions On Pattern Analysis And Machine Intelligence, vol. II, No. 7, Jul., 1989.

G. Strang, "Wavelets and Dilation Equations: A Brief Introduction", SIAM Review, Aug., 1989.

R. R. Coifman, "Multiresolution Analysis in Non-Homogeneous Media", Wavelets, Proceedings of Dec. 1987 Conference, Springer-Verlag (1989).

P. Hanusse, "An Algorithm for Fast Imaging of Wavelet Transforms", Wavelets, Proceedings of Dec. 1987 Conference, Springer-Verlag (1989).

J. S. Lienard and C. d'Alessandro, "Wavelets and Granular Analysis of Speech", Wavelets, Proceedings of Dec. 1987 COnference, Springer-Verlag (1989).

R. R. Coifman, "Wavelet Analysis And Signal Processing", IMA Volumes In Mathemetics And Its Applications, vol. 22, Springer Verlag, 1990.

METHOD AND APPARATUS FOR ENCODING AND DECODING USING WAVELET-PACKETS

BACKGROUND OF THE INVENTION

This invention relates to a method and apparatus for encoding and decoding signals which may represent any continuous or discrete values.

It is well established that various types of signals can be efficiently encoded and subsequently decoded in a manner which substantially reduces the size of the information required (e.g. number of bits, bandwidth, or memory) without undue or noticeable degradation of the decoded signal. Examples are the types of audio and video bandwidth compression schemes that are currently in widespread use.

In signal analysis, it is often useful to recognize the appearance of characteristic frequencies, but this knowledge generally has to be coupled with the location of the time (or space) interval giving rise to the frequency. Such questions can usually be tackled by use of the windowed Fourier transform, with different size windows corresponding to the scale of the transient feature. This analysis can be achieved by correlating the signal to all windowed exponentials and checking for large correlations. Unfortunately, due to lack of independence, information obtained can be redundant and inefficient for feature reconstruction purposes.

It is among the objects of the present invention to provide an improved encoding and decoding method and apparatus which overcomes limitations of prior art techniques and provides improved and more efficient operation.

SUMMARY OF THE INVENTION

The present invention involves, in part, the use of a library of modulated wavelet-packets which are effective in providing both precise frequency localization and space localization. An aspect of the invention involves feature extraction by determination of the correlations of a library of waveforms with the signal being processed, while maintaining orthogonality of the set of waveforms selected (i.e. a selected advantageous basis).

In accordance with an embodiment of the invention, a method is provided for encoding and decoding an input signal, comprising the following steps: applying combinations of dilations and translations of a wavelet to the input signal to obtain processed values; computing the information costs of the processed values; selecting, as encoded signals, an orthogonal group of processed values, the selection being dependent on the computed information costs; and decoding the encoded signals to obtain an output signal. As used herein, wavelets are zero mean value orthogonal basis functions which are non-zero over a limited extent and are used to transform an operator by their application to the operator in a finite number of scales (dilations) and positions (translations) to obtain transform coefficients. [In the computational context, very small non-zero values may be treated as zero if they are known not to affect the desired accuracy of the solution to a problem.] A single averaging wavelet of unity mean is permitted. Reference can be made, for example, to: A. Haar, Zur Theorie der Orthogonalen Functionsysteme, Math Annal. 69 (1910); K. G. Beauchamp, Walsh Functions And Their Applications, Academic Press (1975); I. Daubechies, Orthonormal Bases of Compactly Supported Wavelets, Comm. Pure Appl. Math XL1 (1988).

In a preferred embodiment of the invention, the wavelet has a plurality of vanishing moments. In this embodiment, the step of applying combinations of dilations and translations of the wavelet to the input signal to obtain processed values comprises correlating said combinations of dilations and translations of the wavelet with the input signal. The combinations of dilations and translations of the wavelet are designated as wavelet-packets, and in a disclosed embodiment the step of applying wavelet-packets to the input signal to obtain processed values includes: generating a tree of processed values, the tree having successive levels obtained by applying to the input signal, for a given level, wavelet-packets which are combinations of the wavelet-packets applied at a previous level. Also in a disclosed embodiment, the steps of computing information costs and selecting an orthogonal group of processed values includes performing said computing at a number of different levels of said tree, and performing said selecting from among the different levels of the tree to obtain an orthogonal group having a minimal information cost (the "best basis"). Also in this embodiment, the step of selecting an orthogonal group of processed values includes generating encoded signals which represent said processed values in conjunction with their respective locations in said tree.

Further features and advantages of the invention will become more readily apparent from the following detailed description when taken in conjunction with the accompanying drawings.

DESCRIPTION OF THE PREFERRED EMBODIMENTS

Figure 1:
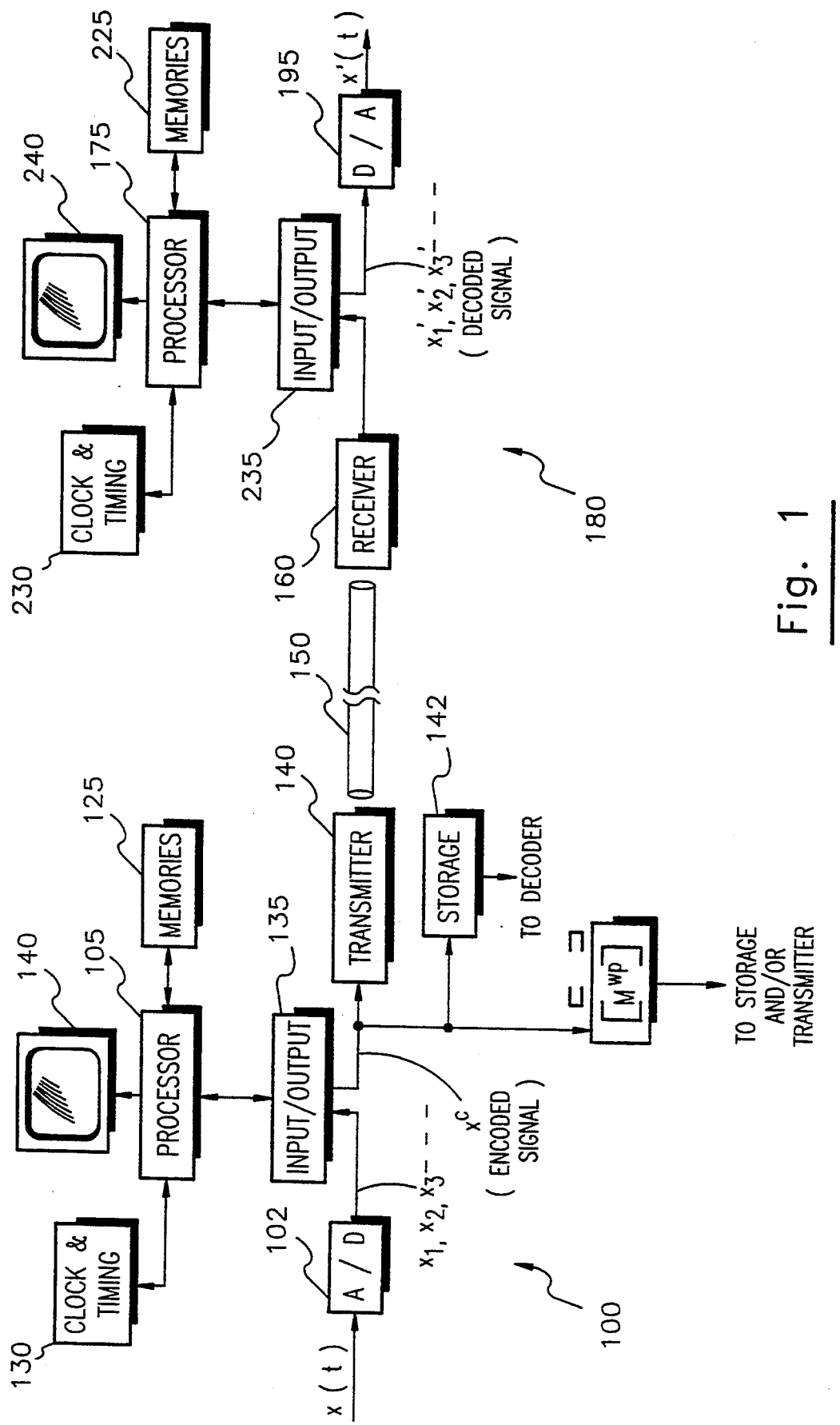
FIG. 1 is a block diagram of an apparatus in accordance with an embodiment of the invention, and which can be used to practice the method of the invention.

Referring to FIG. 1, there is shown a block diagram of an apparatus in accordance with an embodiment of the invention for encoding and decoding an input signal which can be any continuous or discrete signal or sequence of numbers representing values in one or more dimensions (e.g. audio, still or moving pictures, atmospheric measurement data, etc.) and which, for purposes of illustration, can be considered as an audio signal x(t). At the encoder 100 the signal is coupled to an analog-to-digital converter 102, which produces signal samples $x_1, x_2, x_3 \ldots$, a sequence of which can be envisioned as a vector x. The digital samples are coupled to an encoder processor 105 which, when programmed in the manner to be described, can be used to implement an embodiment of the invention and to practice an embodiment of the method of the invention. The processor 105 may be any suitable processor, for example an electronic digital or analog processor or microprocessor. It will be understood that any general purpose or special purpose processor, or other machine or circuitry that can perform the computations described herein, electronically, optically, or by other means, can be utilized. The processor 105, which for purposes of the particular described embodiments hereof can be considered as the processor or CPU of a general purpose electronic digital computer, such as a SUN-3/50 Computer sold by Sun Microsystems, will typically include memories 125, clock and timing circuitry 130, input/output functions 135 and display functions 140, which may all be of conventional types.

With the processor appropriately programmed, as described hereinbelow, a compressed output signal $x^c$ is produced which is an encoded version of the input signal, but which requires less bandwidth. In the illustration of FIG. 1, the encoded signals $x^c$ are shown as being coupled to a transmitter 140 for transmission over a communications medium (air, cable, fiber optical link, microwave link, etc.) 150 to a receiver 160. The encoded signals are also illustrated as being coupled to a storage medium 142, which may alternatively be part of the processor subsystem 105, and are also illustrated as being manipulated such as by multiplication by a sparse matrix $M^{wp}$, as described in the abovereferenced copending U.S. patent application Ser. No. 525,974, filed or even date herewith. [See also Appendix III.] The matrix $M^{wp}$ can obtain be obtained using the wavelet-packet best basis selection hereof (see also Appendix V). The signal itself may, of course, also be in the form of a matrix (i.e., a collection of vectors). The stored and/or manipulated signals can be decoded by the same processor subsystem 105 (suitably programmed, as will be described) or other decoding means.

In the illustrated embodiment, another processor 175, which is shown as being similar to the processor 105, also includes memories 225, clock and timing circuitry 230, input/output functions 235, and display functions 240, which may again be of conventional types. Processor 175 is employed, when suitably programmed as described, to decode the received encoded signal $x^c$, and to produce an output digital signal $x_1', x_2', x_3' \ldots$, (or vector x') which is a representation of the input digital signal, and which can be converted, such as by digital-to-analog converter 195, to obtain an analog representation x'(t) of the original input signal x(t). As will become understood, the accuracy of the representation will depend upon the encoding process and the degree of bandwidth compression.

Before describing the underlying theory of the invention, it is noted that reference can be made to Appendices I–V, appended hereto, for supplemental description of the theoretical foundations and further approaches.

Figure 2:
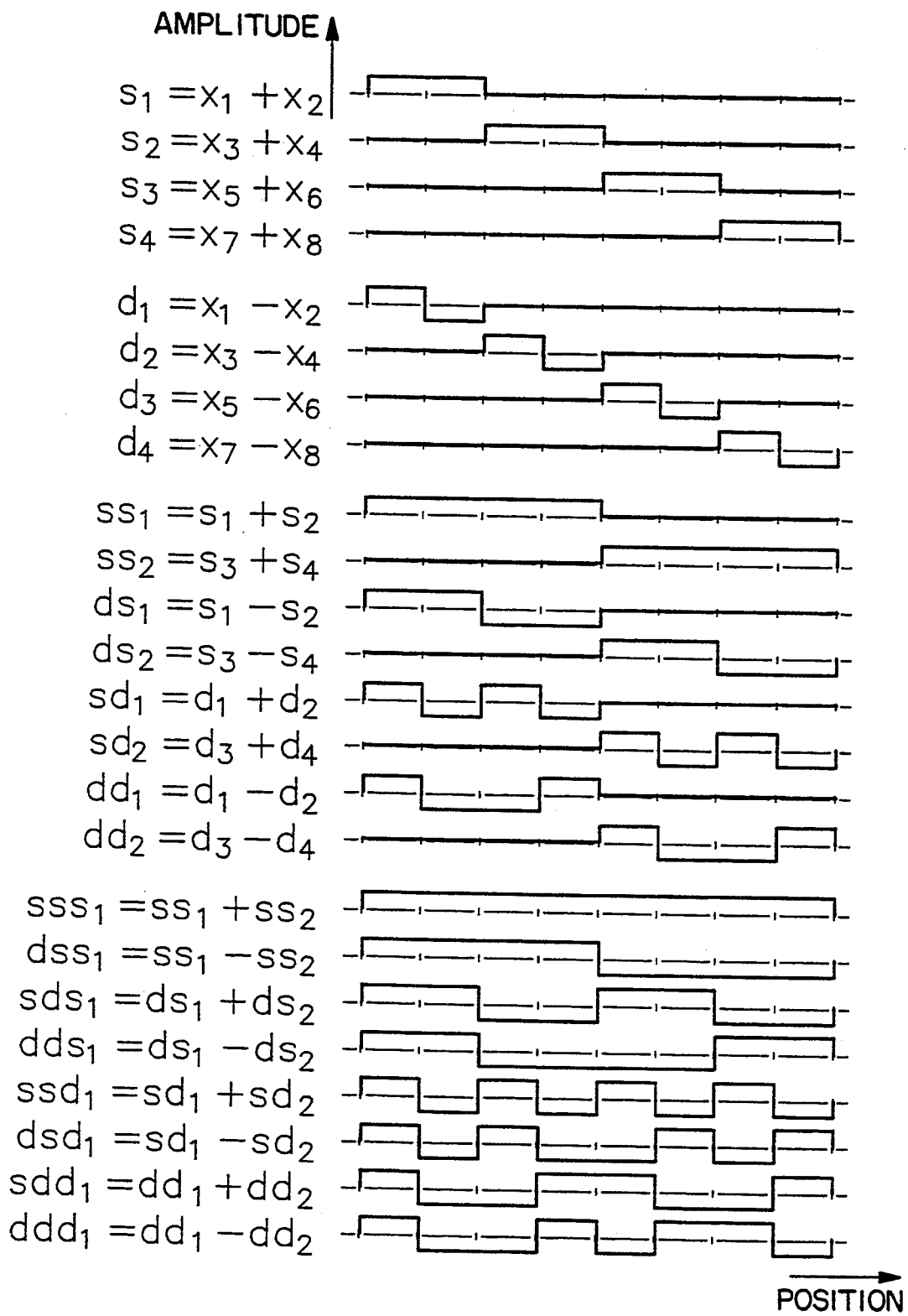
FIG. 2 is a diagram illustrating Haar functions and combinations of dilations and translations of such functions.

A well known wavelet basis, which has a single vanishing moment, as defined hereinbelow, is the Haar basis [see, for example, A. Haar, Zur Theorie Der Orthogonalen Funktionensysteme, Math Annal. 69, 1910, and Appendix I of the abovereferenced copending U.S. patent application Ser. No. 525,974, filed of even date herewith]. Consider the Haar basis as applied to a simplified case of eight samples $x_1, x_2 \ldots x_8$. For uniform amplitudes, and ignoring normalizing coefficients (which are multiples of $1/\sqrt{2}$ for Haar wavelets), a set of waveforms can be developed from combinations of Haar wavelets, as illustrated in FIG. 2 and in accordance with the following relationships:

$$\begin{aligned} s_1 &= x_1 + x_2 \\ s_2 &= x_3 + x_4 \\ s_3 &= x_5 + x_6 \\ s_4 &= x_7 + x_8 \\ d_1 &= x_1 - x_2 \\ d_2 &= x_3 - x_4 \\ d_3 &= x_5 - x_6 \\ d_4 &= x_7 - x_8 \end{aligned} \quad (1)$$

$$\begin{aligned} ss_1 &= s_1 + s_2 \\ ss_2 &= s_3 + s_4 \\ ds_1 &= s_1 - s_2 \\ ds_2 &= s_3 - s_4 \\ sd_1 &= d_1 + d_2 \\ sd_2 &= d_3 + d_4 \\ dd_1 &= d_1 - d_2 \\ dd_2 &= d_3 - d_4 \end{aligned} \quad (2)$$

$$\begin{aligned} sss_1 &= ss_1 + ss_2 \\ dss_1 &= ss_1 - ss_2 \\ sds_1 &= ds_1 + ds_2 \\ dds_1 &= ds_1 - ds_2 \\ ssd_1 &= sd_1 + sd_2 \\ dsd_1 &= sd_1 - sd_2 \\ sdd_1 &= dd_1 + dd_2 \\ ddd_1 &= dd_1 - dd_2 \end{aligned} \quad (3)$$

The first group of relationships, (1) [the top eight waveforms in FIG. 2], are Haar functions, and are orthogonal. The last group of relationships, (3) [the bottom eight waveforms in FIG. 2], are the first eight of the well known Walsh functions. As is known in the art, the Walsh functions are orthogonal and complete, and can be advantageously used to transform and subsequently back-transform certain types of signals to achieve, inter alia, signal compression. It can be observed, however, that the set of the entire twenty-four functions of FIG. 2 is not orthogonal, which follows from the fact that some of the functions are derived from combinations of other functions. For example, $sd_1$ is the sum of $d_1$ and $d_2$, and is not orthogonal to $d_1$ or to $d_2$.

Figure 3:
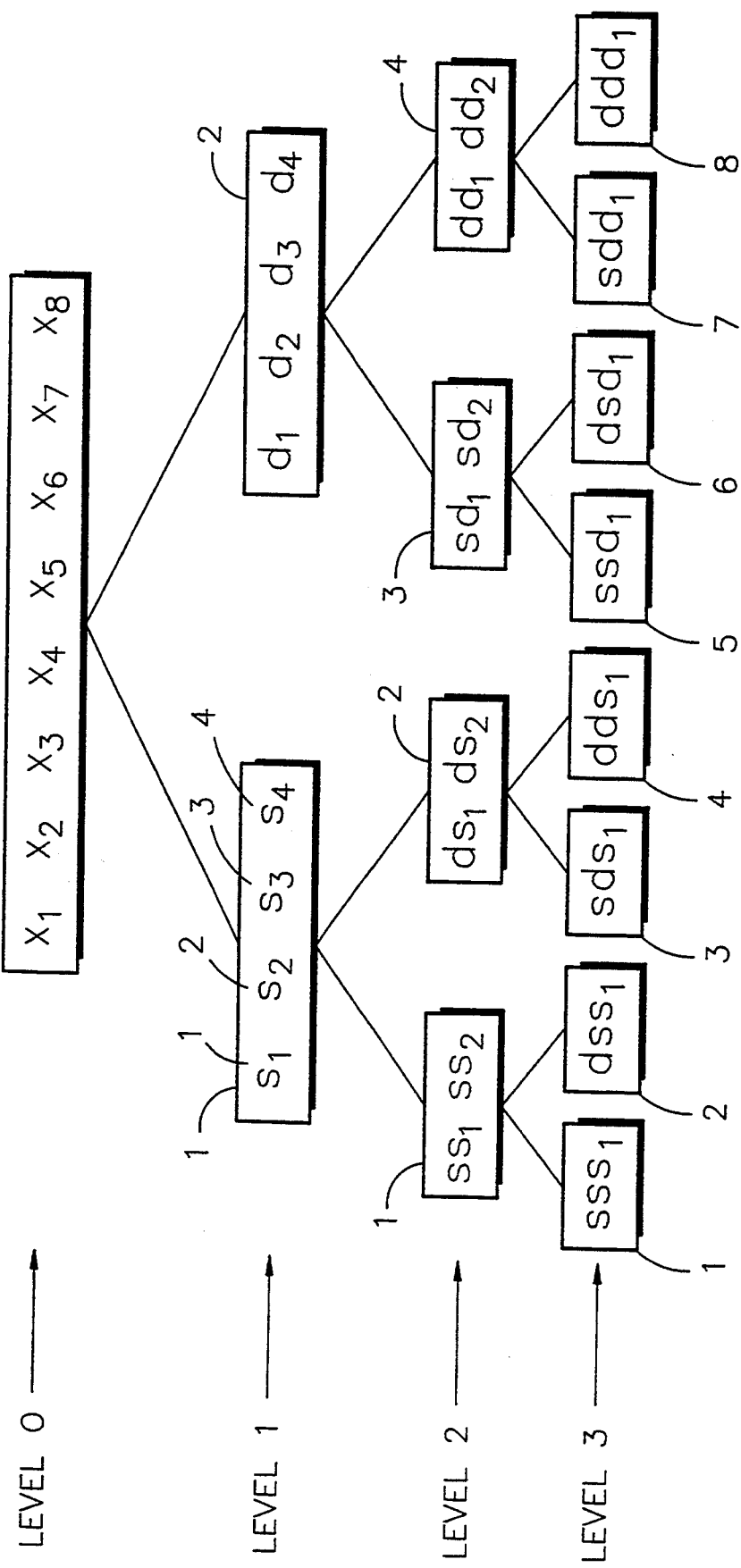
FIG. 3 illustrates a tree of nodes.
Figures 4A, 4B, 4C, 4D:
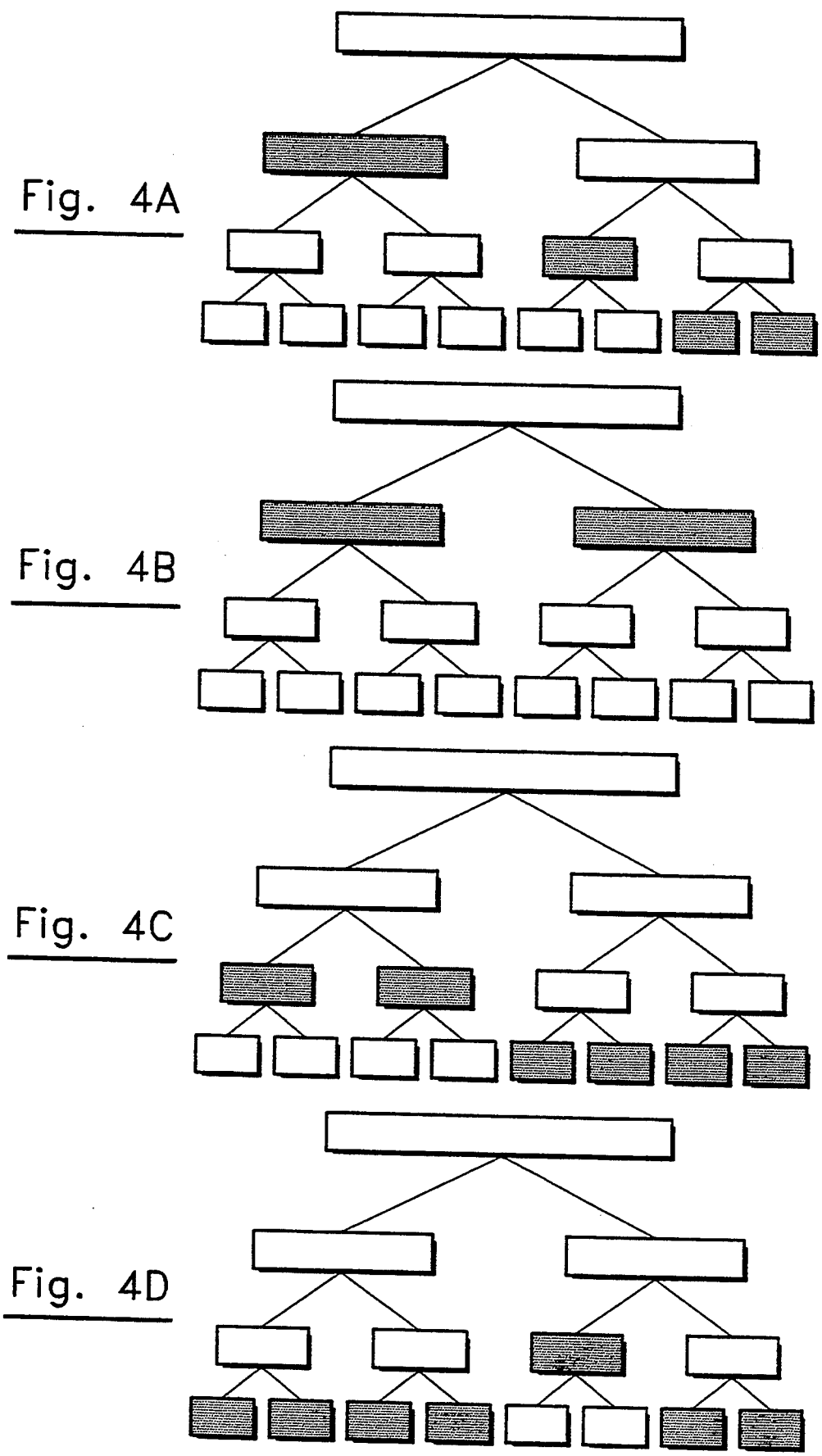
FIGS. 4A, 4B, 4C, and 4D illustrate examples of possible orthogonal bases.

The sums and differences of relationships (1)–(3) are arranged in a tree of "nodes" in FIG. 3. Four "levels" are shown, level 0 being the sample data, and levels 1, 2 and 3 respectively corresponding to the groups of relationships (1), (2) and (3) above. The boxes ("nodes") at each level contain respective sum and difference terms, and are connected by branches to the nodes from which they are derived. It is seen that level 1 has two nodes (labelled, from left to right, 1 and 2), level 2 has four nodes (labelled, from left to right, 1–4), and level 3 has eight nodes (labelled, from left to right, 1–8). It follows that a level k would have $2^k$ nodes. The "positions" of the functions (or members) within a node are also numbered, from left to right, as illustrated in node 1 of level 1 (only). The nodes of level 1 each have four positions, the nodes of the level 2 each have two positions, and the nodes of level 3 each have one position. It is seen that each "parent" node has two "child" nodes, the members of the children being derived from those of the parent. Thus, for example, node 1 of level 2 and node 2 of level 2 are both children of node 1 of level 1. This follows from the relationship (2) set forth above. In particular, the members of node 1, level 2 ($ss_1$ and $ss_2$) are derived from sums of members of node 1, level 1, and the members of node 2, level 2 ($ds_1$ and $ds_2$) are derived from differences of members of node 1, level 1.

In accordance with an aspect of the present invention, a complete set of functions (that is, a set or "basis" which permits reconstruction of the original signal samples) is obtained from the tree, permitting selection of nodes from any level. The selection is made in a manner which minimizes the information cost of the basis; i.e., the selected basis can be represented with a minimum bandwidth requirement or minimum number of bits for a given quality of information conveyed. Orthogonality of the selected basis is maintained by following the rule that no ancestor (parent, grandparent, etc.) of a selected node is used. [Conversely, no descendant (child, grandchild, etc.) of a selected node is used.] For the simplified tree of FIG. 3, there are twenty five possible orthogonal basis selections. Using shaded boxes to indicate the nodes selected for a given basis, four examples of possible orthogonal bases are shown in FIGS. 4A–4D. If desired a basis which is the best level basis could alternatively be determined and used.

The Haar wavelet system and wavelet-packets derived therefrom, has been used so far for ease of explanation. In accordance with an aspect of the present invention, advantageous wavelet-packets are generated using wavelets having a plurality of vanishing moments and, preferably, several vanishing moments. For description of the types of wavelets from which these wavelet-packets can be derived, reference can be made to I. Daubechies, Orthonormal Bases of Compactly Supported Wavelets, Comm. Pure, Applied Math, XL1, 1988; Y. Meyer Principe d'Incertitude, Bases Hilbertiennes et Algébres d'Opérateurs, Séminaire Bourbaki, 1985–86, 662, Astérisque (Société Mathématique de France); S. Mallat, Review of Multifrequency Channel Decompositon of Images and Wavelet Models, Technical Report 412, Robotics Report 178, NYU (1988), and the aboverefrenced copending U.S. patent application Ser. No. 525,974, filed of even date herewith.

Figure 5:
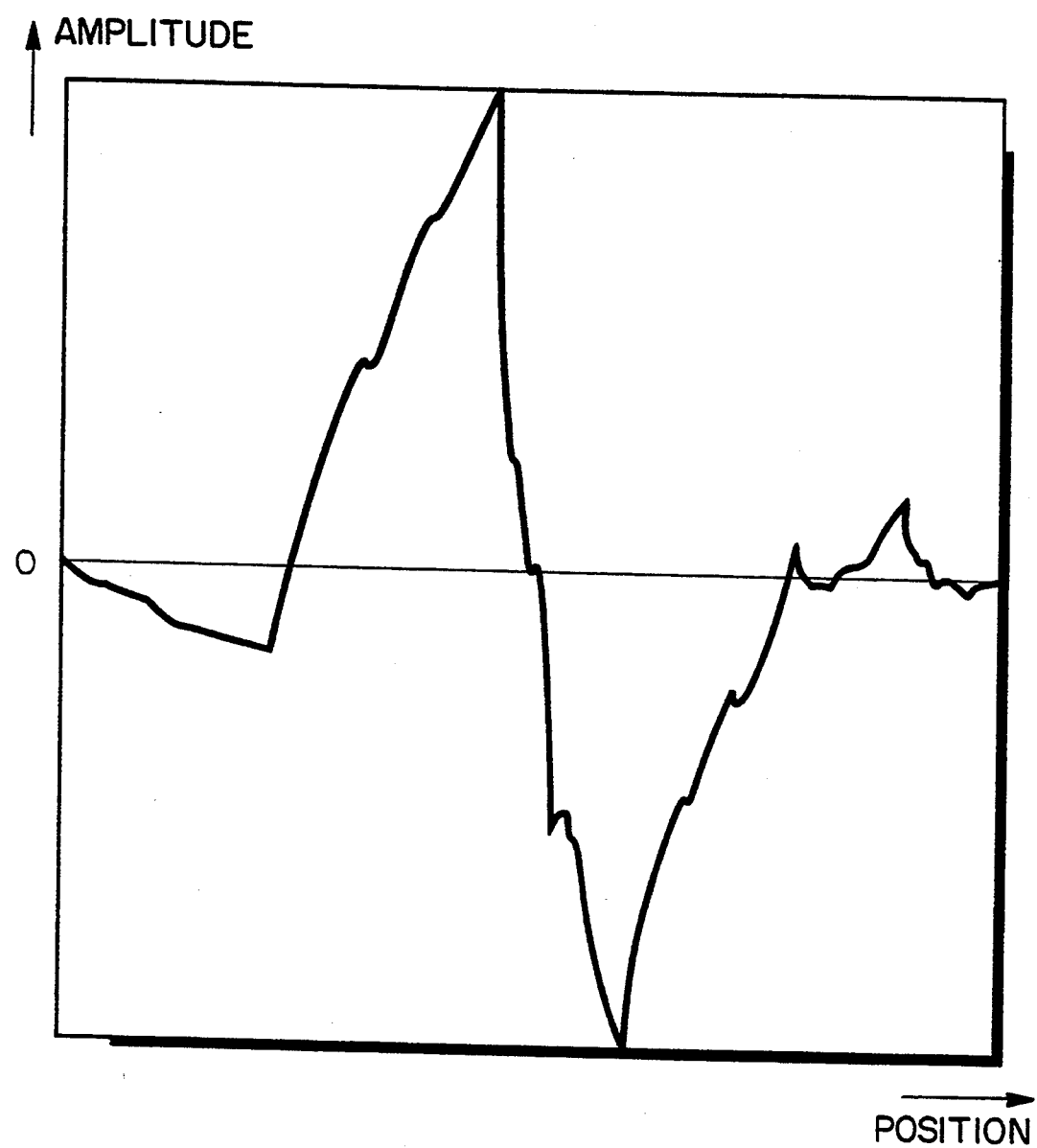
FIG. 5 illustrates a wavelet having two vanishing moments.
Figure 6:
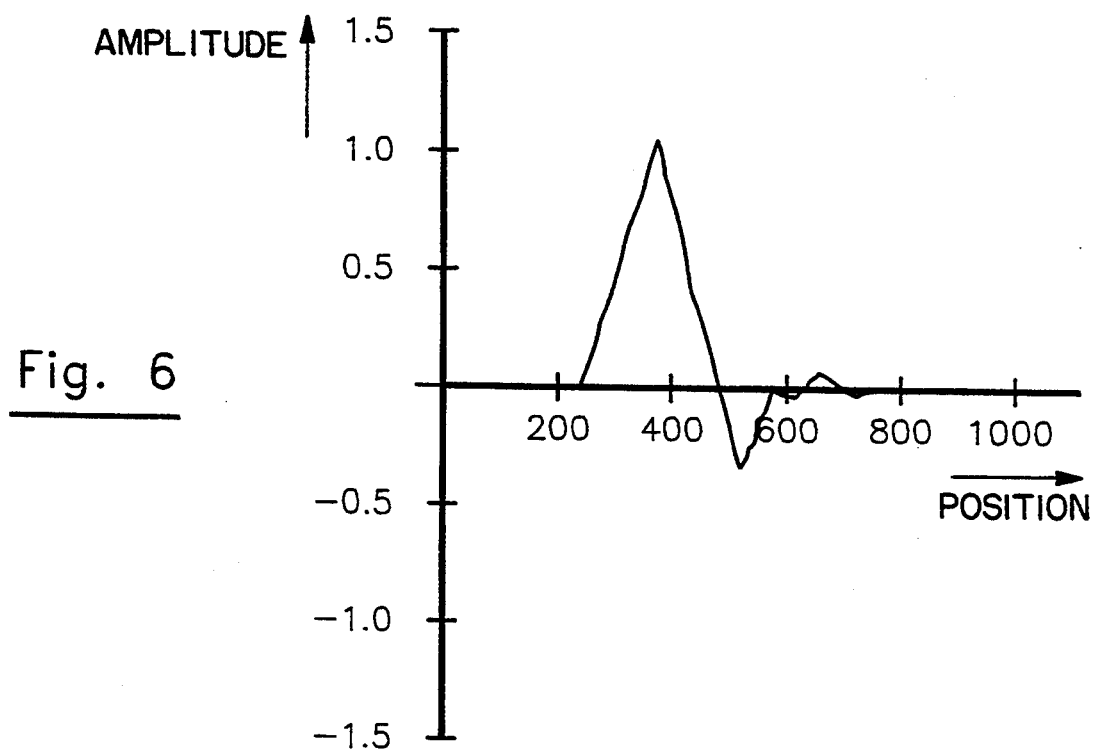
FIGS. 6—13 illustrates examples of wavelet-packets.
Figure 7:
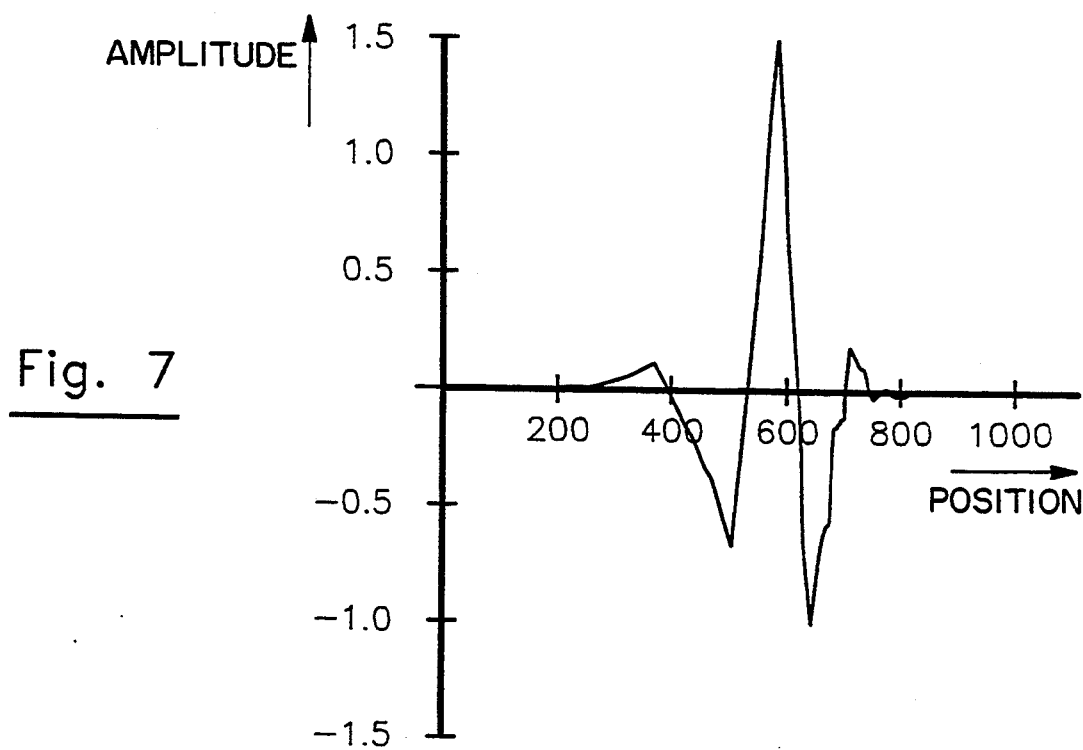
Figure 8:
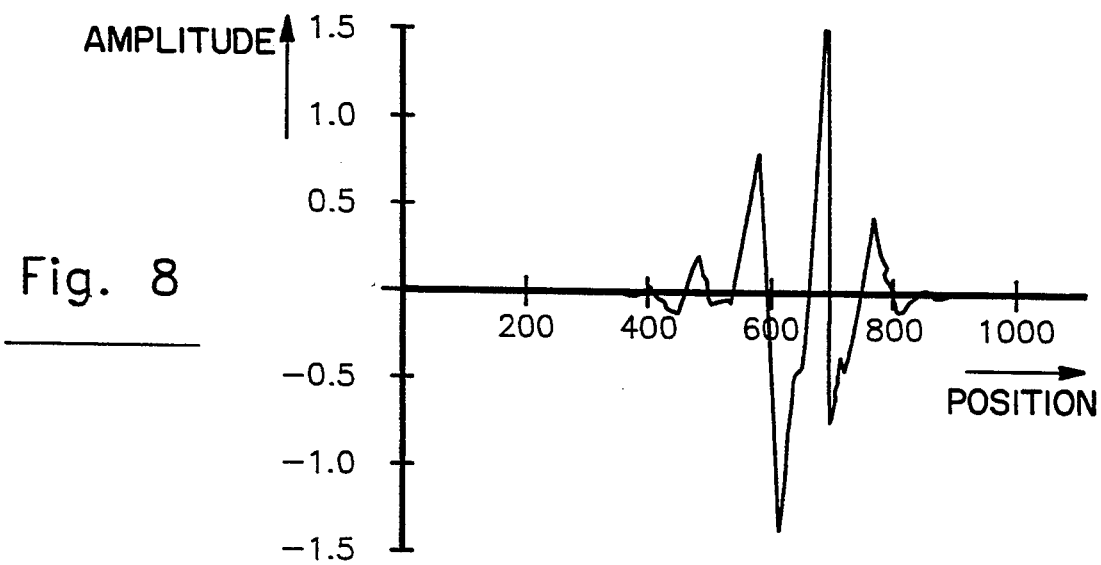
Figure 9:
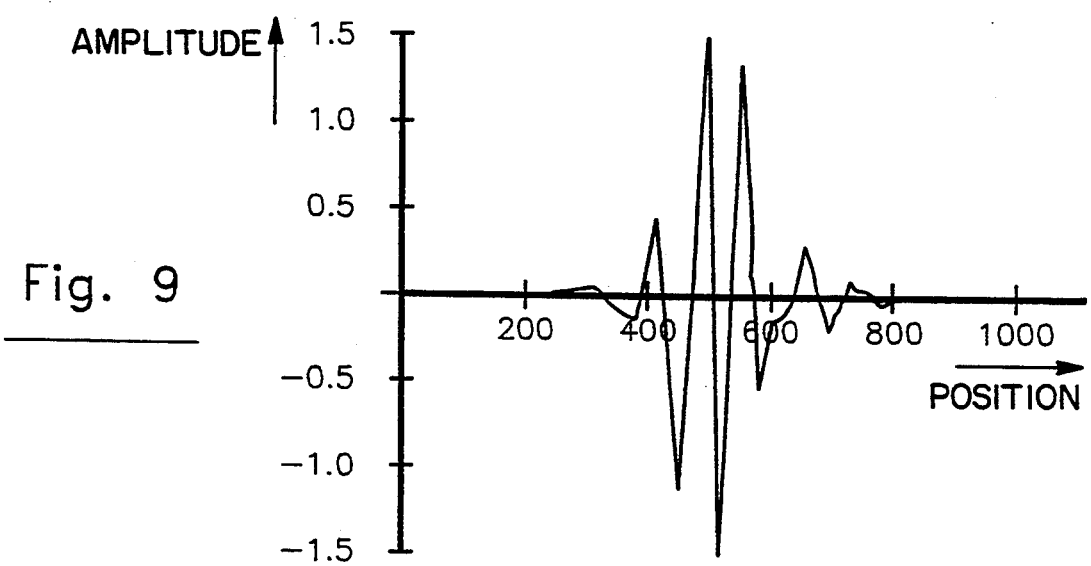
Figure 10:
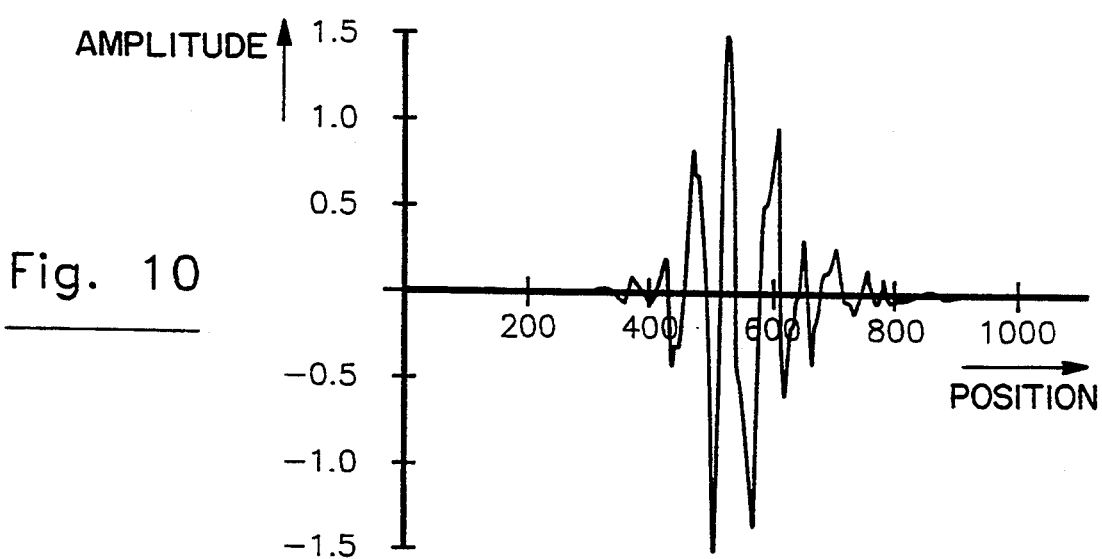

The wavelet illustrated in FIG. 5 has two vanishing moments. As used herein, the number of vanishing moments, for a wavelet $\Psi(x)$ is determined the highest integer n for which $$\int \Psi(x) x^k dx = 0$$

where $0 \leq k \leq n-1$, and this is known as the vanishing moments condition. Using this convention, the Haar wavelet has 1 vanishing moment, and the wavelet of FIG. 5 has 2 vanishing moments. [It is generally advantageous to utilize wavelets having as many vanishing moments as is practical, it being understood that the computational burden increases as the number of vanishing moments (and coefficients) increases. Accordingly, a trade-off exists which will generally lead to use of a moderate number of vanishing moments.] The wavelet of FIG. 5 has coefficients as follows (see e.g. Daubechies, supra):

$$h_1 = (1 + \sqrt{3})/4\sqrt{2}$$

$$h_2 = (3 + \sqrt{3})/4\sqrt{2}$$

$$h_3 = (3 - \sqrt{3})/4\sqrt{2}$$

$$h_4 = (1 - \sqrt{3})/4\sqrt{2}$$

$$g_1 = h_4$$

$$g_2 = -h_3$$

$$g_3 = h_2$$

$$g_4 = -h_1$$

The vanishing moments condition, written in terms of defining coefficients, would be the following:

$$\sum_{i=1}^{L} g_i i^k = 0$$

where $$0 \leq k \leq n - 1$$

and $$g_i = (-1)^{L-i+1} h_{L-i+1}$$

and L is the number of coefficients.

The procedure for applying this wavelet is similar to that for the Haar wavelet, but groups of four elements are utilized and are multiplied by the h coefficients and the g coefficients to obtain the respective terms of opposing polarity. To obtain wavelet-packets from the wavelets, the previously illustrated levels of sum and difference terms are obtained using the h and g coefficients, respectively. The "sum" correlation terms for the first level are computed as follows:

$$\begin{aligned} s_1 &= h_1 x_1 + h_2 x_2 + h_3 x_3 + h_4 x_4 \\ s_2 &= h_1 x_3 + h_2 x_4 + h_3 x_5 + h_4 x_6 \\ s_3 &= h_1 x_5 + h_2 x_6 + h_3 x_7 + h_4 x_8 \\ &\quad \cdot \\ &\quad \cdot \\ s_{k/2} &= h_1 x_{k-1} + h_2 x_k + h_3 x_{k+1} + h_4 x_{k+2} \end{aligned} \quad (4)$$

The "difference" correlation terms for the first level are computed as follows:

$$\begin{aligned} d_1 &= g_1 x_1 + g_2 x_2 + g_3 x_3 + g_4 x_4 \\ d_2 &= g_1 x_3 + g_2 x_4 + g_3 x_5 + g_4 x_6 \\ d_3 &= g_1 x_5 + g_2 x_6 + g_3 x_7 + g_4 x_8 \\ &\quad \cdot \\ &\quad \cdot \\ d_{k/2} &= g_1 x_{k-1} + g_2 x_k + g_3 x_{k+1} + g_4 x_{k+2} \end{aligned} \quad (5)$$

The four sets of second level sum and difference correlation terms can then be computed from the first level values as follows:

$$ss_1 = h_1s_1 + h_2s_2 + h_3s_3 + h_4s_4$$
$$ss_2 = h_1s_3 + h_2s_4 + h_3s_5 + h_4s_6 \quad (6)$$
$$ss_3 = h_1s_5 + h_2s_6 + h_3s_7 + h_4s_8$$
$$\vdots$$
$$ss_{k/4} = h_1s_{k/2-1} + h_2s_{k/2} + h_3s_{k/2+1} + h_4s_{k/2+2}$$

$$ds_1 = g_1s_1 + g_2s_2 + g_3s_3 + g_4s_4$$
$$ds_2 = g_1s_3 + g_2s_4 + g_3s_5 + g_4s_6 \quad (7)$$
$$ds_3 = g_1s_5 + g_2s_6 + g_3s_7 + g_4s_8$$
$$\vdots$$
$$ds_{k/4} = g_1s_{k/2-1} + g_2s_{k/2} + g_3s_{k/2+1} + g_4s_{k/2+2}$$

$$sd_1 = h_1d_1 + h_2d_2 + h_3d_3 + h_4d_4$$
$$sd_2 = h_1d_3 + h_2d_4 + h_3d_5 + h_4d_6 \quad (8)$$
$$sd_3 = h_1d_5 + h_2d_6 + h_3d_7 + h_4d_8$$
$$\vdots$$
$$sd_{k/4} = h_1d_{k/2-1} + h_2d_{k/2} + h_3d_{k/2+1} + h_3d_{k/4+2}$$

$$dd_1 = g_1d_1 + g_2d_2 + g_3d_3 + g_4d_4$$
$$dd_2 = g_1d_3 + g_2d_4 + g_3d_5 + g_4d_6 \quad (9)$$
$$dd_3 = g_1d_5 + g_2d_6 + g_3d_7 + g_4d_8$$
$$\vdots$$
$$dd_{k/4} = g_1d_{k/2-1} + g_2d_{k/2} + g_3d_{k/2+1} + g_4d_{k/2+2},$$

and so on. Extra values at end positions can be handled by "wrap-around", truncation, or other known means of handling end conditions. It will be understood that the procedure described in conjunction with relationships (4)–(9) is operative to successively correlate the signal samples with the wavelet-packets for each successive level. If desired, the correlation can be implemented by generating wavelet-packets a priori (using the indicated coefficients, for this example), and then individually correlating wavelet-packets with the signal using analog (e.g. electronic or optical means), digital, or any suitable technique. If desired, a special purpose network could be used to perform the correlations.

In terms of the diagram of FIG. 3, the sums (4) and the differences (5) would occupy nodes 1 and 2, respectively, of level 1, and the sums (6), differences (7), sums (8) and differences (9) would occupy the nodes 1, 2, 3 and 4, respectively, of level 2.

Figure 11:
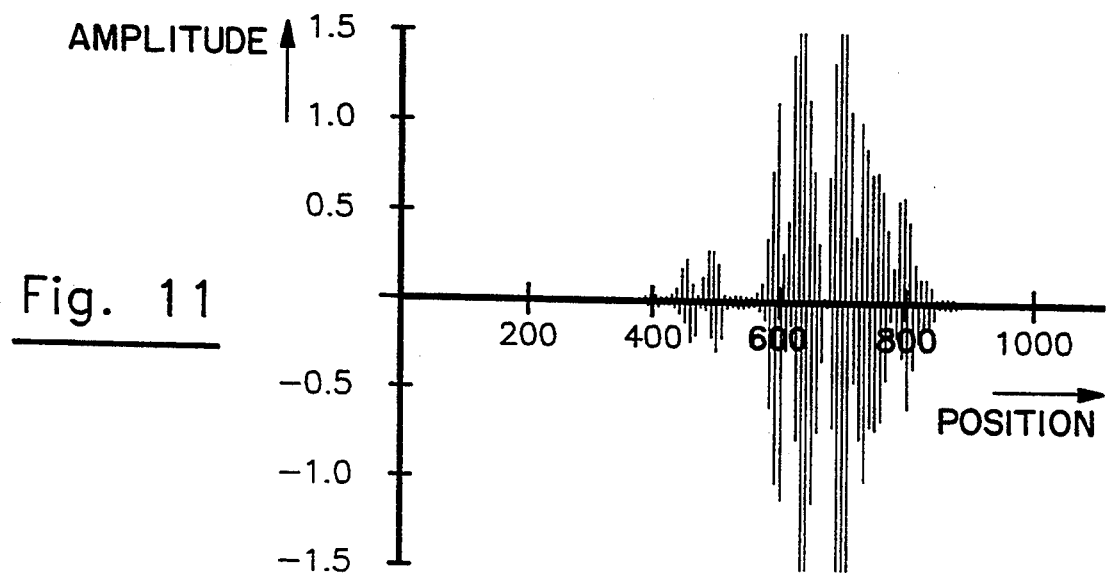
Figure 12:
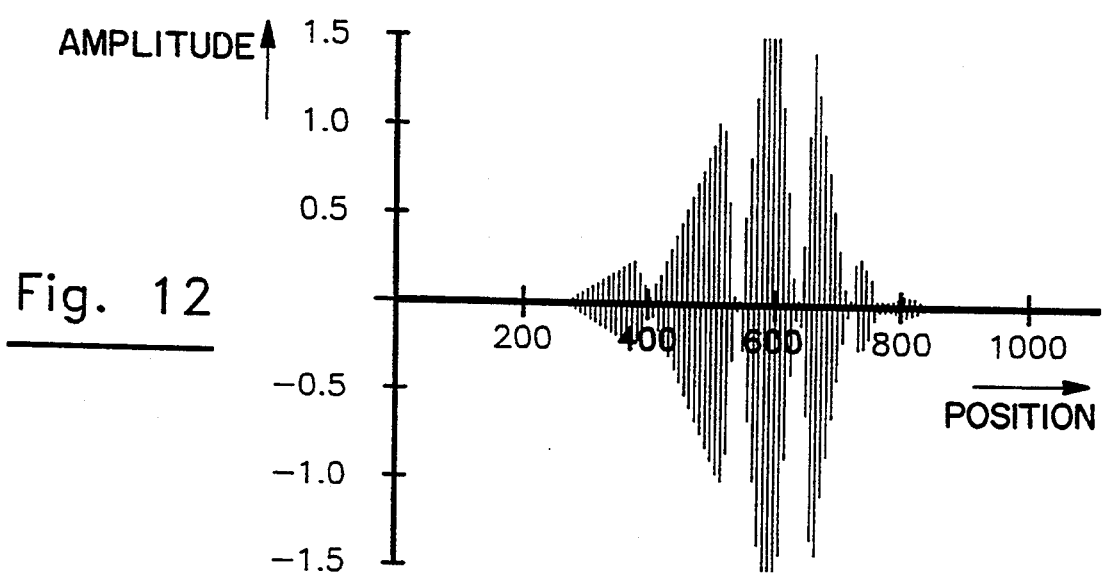
Figure 13:
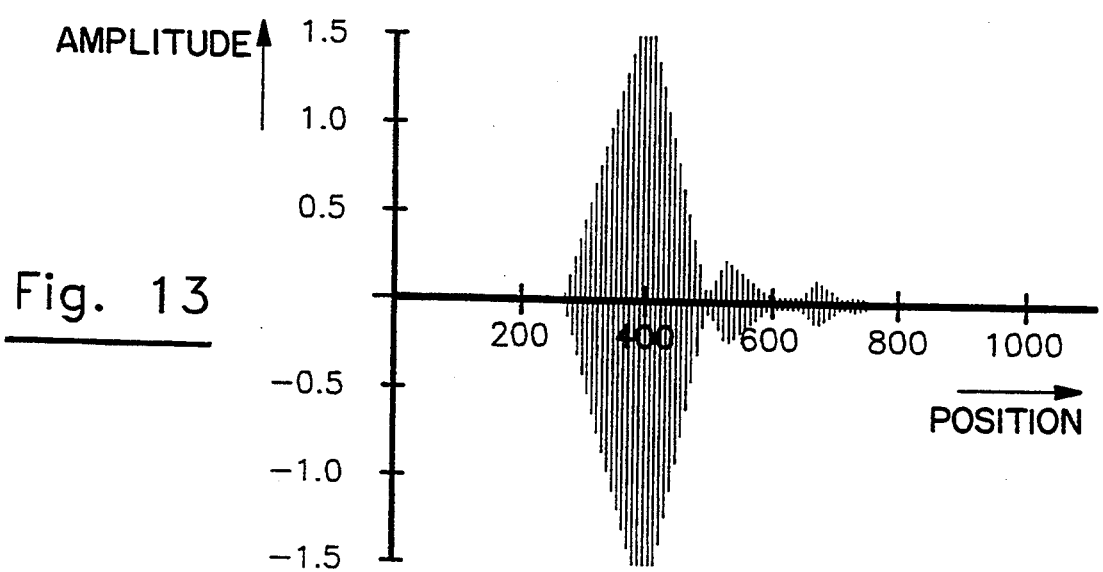

It will be understood that in many practical situations the number of samples considered in a frame or window (level 0) will be larger than 8, and the tree will also be larger than those shown here for ease of illustration. FIGS. 6–10 show the first five wavelet-packets synthesized for sample length 1024, using a wavelet with six coefficients (six h's and six g's), and FIGS. 11–13 illustrate three of the higher frequency wavelet-packets.

Figure 14:
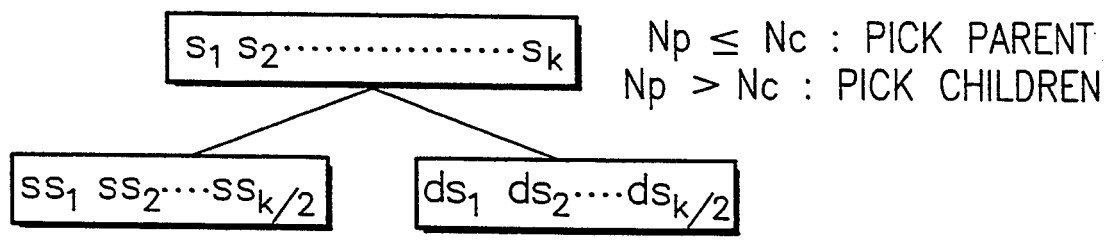
FIG. 14 illustrates an example of how information cost can be computed.

In accordance with an aspect of the invention, the basis is selected in a manner which minimizes information cost. There are various suitable ways in which information cost can be computed. FIG. 14 shows a parent node and its two children nodes. As a measure of information, one can compute the number $N_p$ of correlation values in the parent node that exceed the particular threshold and the total number $N_c$ of correlation values in the child nodes that exceed the particular threshold. As represented in FIG. 14, if $N_p$ is less than or equal to $N_c$, the parent node will be preferred, whereas if $N_p$ is greater than $N_c$, the children nodes will be preferred. As higher level comparisons are made (with the ancestors of the parent) the selection may be supplanted by an ancestor.

Another measure of information cost that can be used is the entropy cost function that is well known in information theory, and is threshold independent (see Appendix IV). Suitable weighting of coefficients can also be used. For example, if it is known or computed that certain values should be filtered, emphasized, or ignored, weighting can be appropriately applied for this purpose.

Figure 15A:
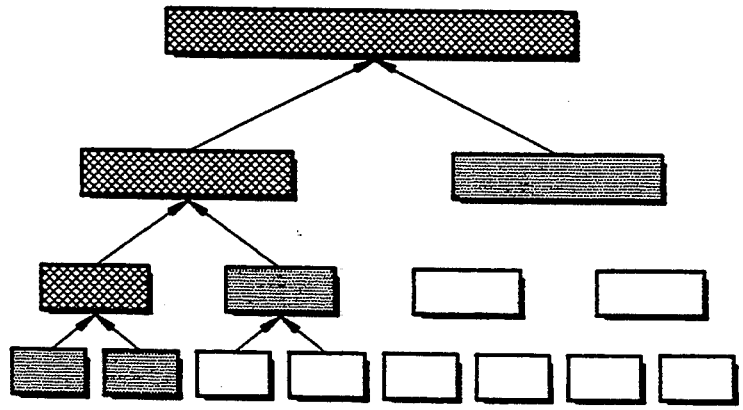
FIGS. 15A and 15B illustrate a procedure for reconstruction in accordance with an embodiment of the invention.

FIG. 15A illustrates a procedure for reconstruction which can be utilized at the decoder processor. The shaded boxes indicate the nodes defining the orthogonal basis that was selected at the encoder and is to be decoded. The arrows illustrate the reconstruction paths, and the cross-hatched boxes indicate reconstructed nodes, the last (level 0) reconstruction providing the reconstructed decoder output information. In particular, node 1, level 2 is reconstructed from node 1, level 3 and node 2, level 3. Node 1, level 1 is then reconstructed from node 1, level 2 and node 2, level 2, and so on.

Figure 15B:
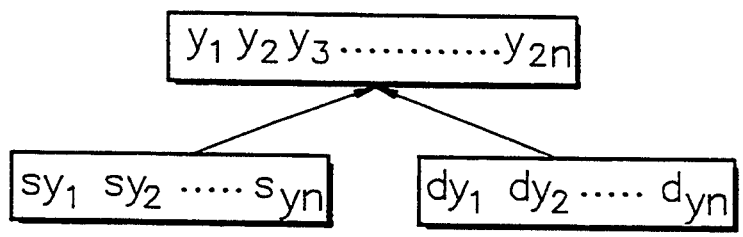

FIG. 15B shows children nodes containing $sy_1, sy_2, \ldots sy_n$ and $dy_1, dy_2, \ldots dy_n$ being mapped into their parent node to obtain the reconstructed $y_1, y_2, \ldots y_{2n}$. If the four coefficients $h_1$, $h_2$, $h_3$ and $h_4$ (with the corresponding $g_1$, $g_2$, $g_3$ and $g_4$) were used for encoding, the decoding relationships will be as follows:

For y odd
$$y_1 = h_1sy_1 + h_3sy_0 + g_1dy_1 + g_3dy_0$$
$$y_3 = h_1sy_2 + h_3sy_1 + g_1dy_2 + g_3dy_1 \quad (10)$$
$$\vdots$$
$$y_{2n+1} = h_1sy_{n+1} + h_3sy_n + g_1dy_{n+1} + g_3dy_n$$

For y even
$$y_2 = h_2sy_1 + h_4sy_0 + g_2dy_1 + g_4dy_0$$
$$y_4 = h_2sy_2 + h_4sy_1 + g_2dy_2 + g_4dy_1 \quad (11)$$
$$\vdots$$
$$y_{2k} = h_2sy_n + h_4sy_{n-1} + g_2dy_n + g_4dy_{n-1}$$

The values mapped into the parent mode are accumulated and, as in the encoder, extra values at the end positions (e.g. at $y_0$ above) can be handled by "wrap-around", truncation, or other known means of handling end conditions.

Figure 16:
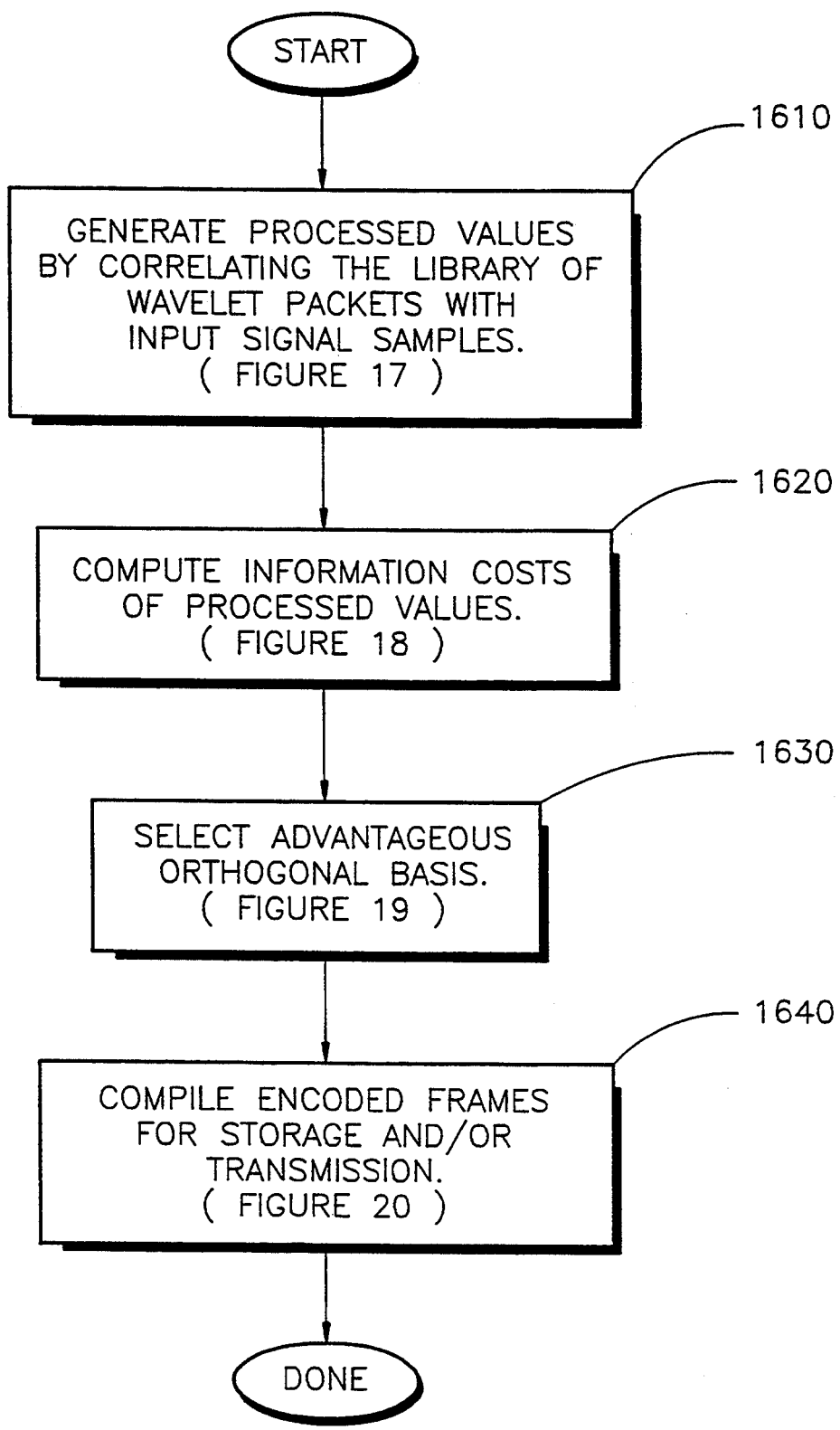
FIG. 16 shows a flow diagram which is suitable for controlling the encoder processor to implement an embodiment of the encoding apparatus and method in accordance with the invention.

Referring to FIG. 16, there is shown a flow diagram which, when taken together with the further flow diagrams referred to therein, is suitable for controlling the processor to implement an embodiment of the encoding apparatus and method in accordance with the invention. The block 1610 represents the generating of processed values by correlating wavelet-packets with the input signal samples. There are various ways in which this can be achieved, the routine of FIG. 17 describing an implementation of the present embodiment. The block 1620 represents the routine, described further in conjunction with FIG. 18, for computing the information costs of the processed values. As described further hereinbelow, there are various ways of computing the measure or cost of information contained in the processed values. In an illustrated embodiment, a thresholding procedure is utilized, and information cost is determined by the number of values which exceed a particular threshold. The block 1630 represents the routine of FIG. 19 for selection of an advantageous orthogonal basis from among the processed values, the selection of the basis being dependent on the computed information costs. The block 1640 represents compiling encoded frames from the selected processed values which constitute the basis, such as for subsequent recovery after processing, storage, and/or transmission. This routine is described in conjunction with FIG. 20.

Figure 17:
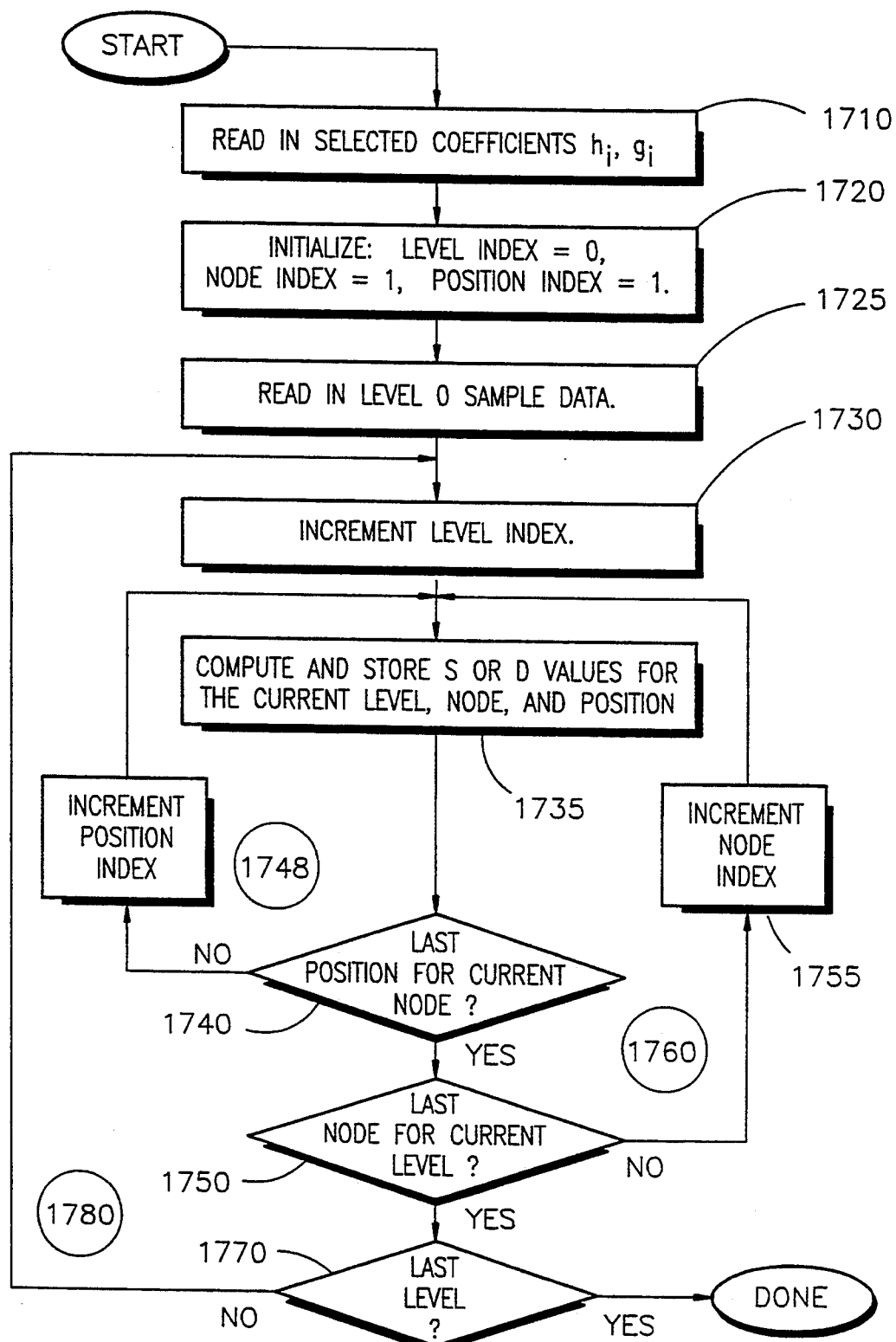
FIG. 17 is a flow diagram of a routine for generating processed values from the sample signal using a wavelet-packet basis.

Referring to FIG. 17, there is shown a flow diagram of a routine for generating the processed values from the sampled signal, or signal portion, using a wavelet-packet basis. The block 1710 represents the reading in of the selected coefficients $h_i$, $g_i$. The block 1720 is then entered, this block representing the initializing of a level index at 0, the initializing of a node index at 1, and the initializing of a position index at 1. The sample data, considered at level 0 is then read in, as represented by the block 1725. The sample data may consist, for example, of 256 sequential samples of an acoustical signal to be compressed and transmitted. The level index is then incremented, as represented by block 1730, and the first level processed values are computed and stored in accordance with the relationships (4) and (5) set forth above (block 1735 and loops 1748 and 1760). For example, for the first position of the first node of level 1, $s_1$ will be computed. If the wavelet employed is representable by a filter having four coefficients, as in the example above, $s_1$ will be computed as the sum of $h_1x_1$, $h_2x_2$, $h_3x_3$, $h_4x_4$. If a wavelet of more vanishing moments is used, more coefficients will be employed. In general, it will be preferable to utilize a wavelet having several coefficients, greater than four, the above examples being set forth for ease of illustration.

In loop 1748, inquiry is made (diamond 1740) as to whether the last position of the current node has been reached. If not, the position index is incremented (block 1745), and the block 1735 is re-entered for computation of the next processed value of the current node and level. The loop 1748 is then continued until all processed values have been computed for the current node, whereupon inquiry is made (diamond 1750) as to whether the last node of the current level has been reached. If not, the node index is incremented (block 1755) and the loop 1760 is continued until the processed values have been computed for all nodes of the current level. For the first level, there will be only two nodes, with the values thereof being computed in accordance with the relationships (4) and (5) set forth above.

When the inquiry of diamond 1750 is answered in the affirmative, diamond 1770 is entered, and inquiry is made as the whether the last level has been processed. If not, the block 1730 is re-entered, to increment the level index, and the loop 1780 is continued until processed values have been obtained for the nodes at all levels of the tree.

Figure 18:
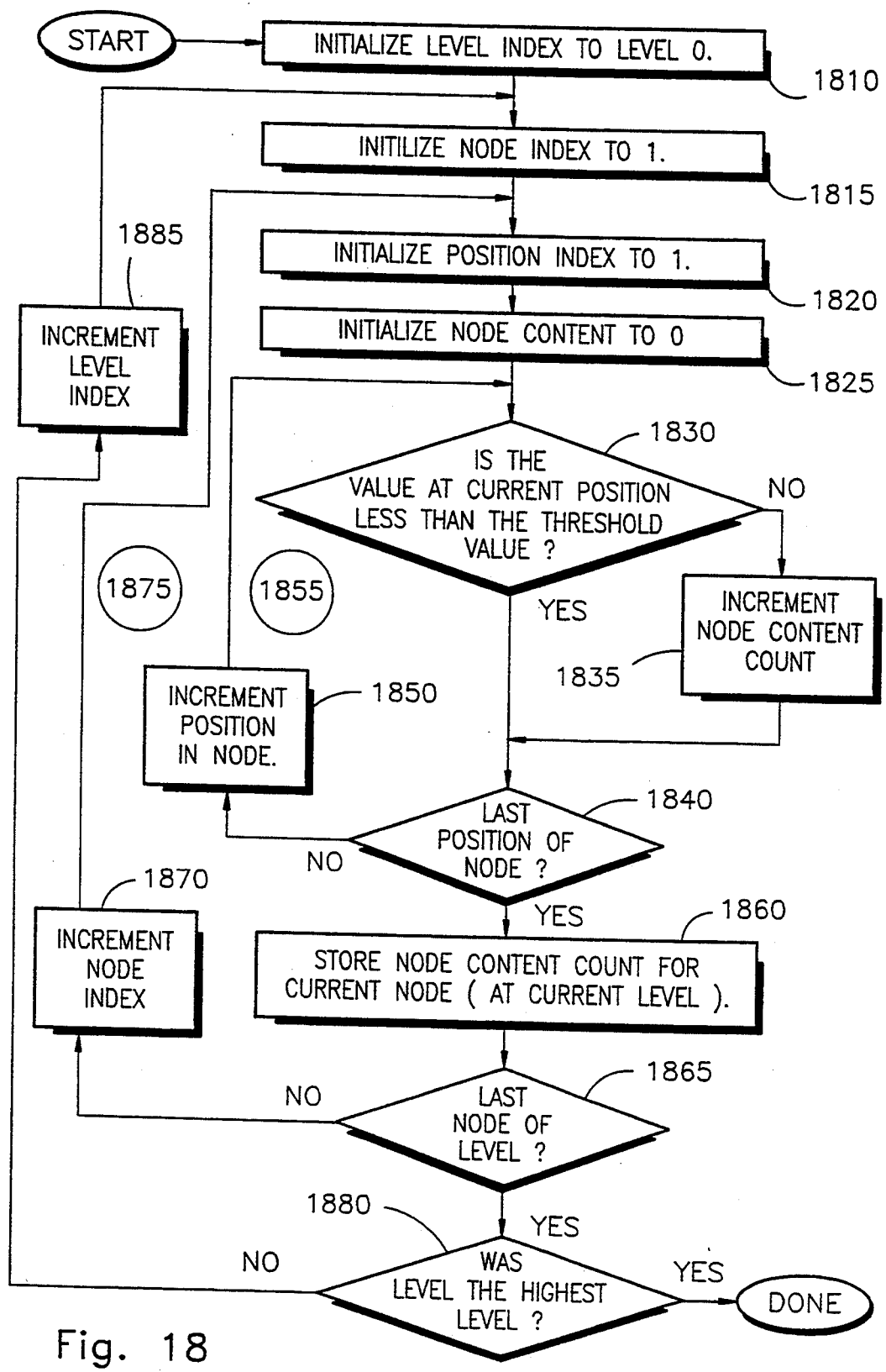
FIG. 18 is a flow diagram of a routine for computing information cost.
Figure 19:
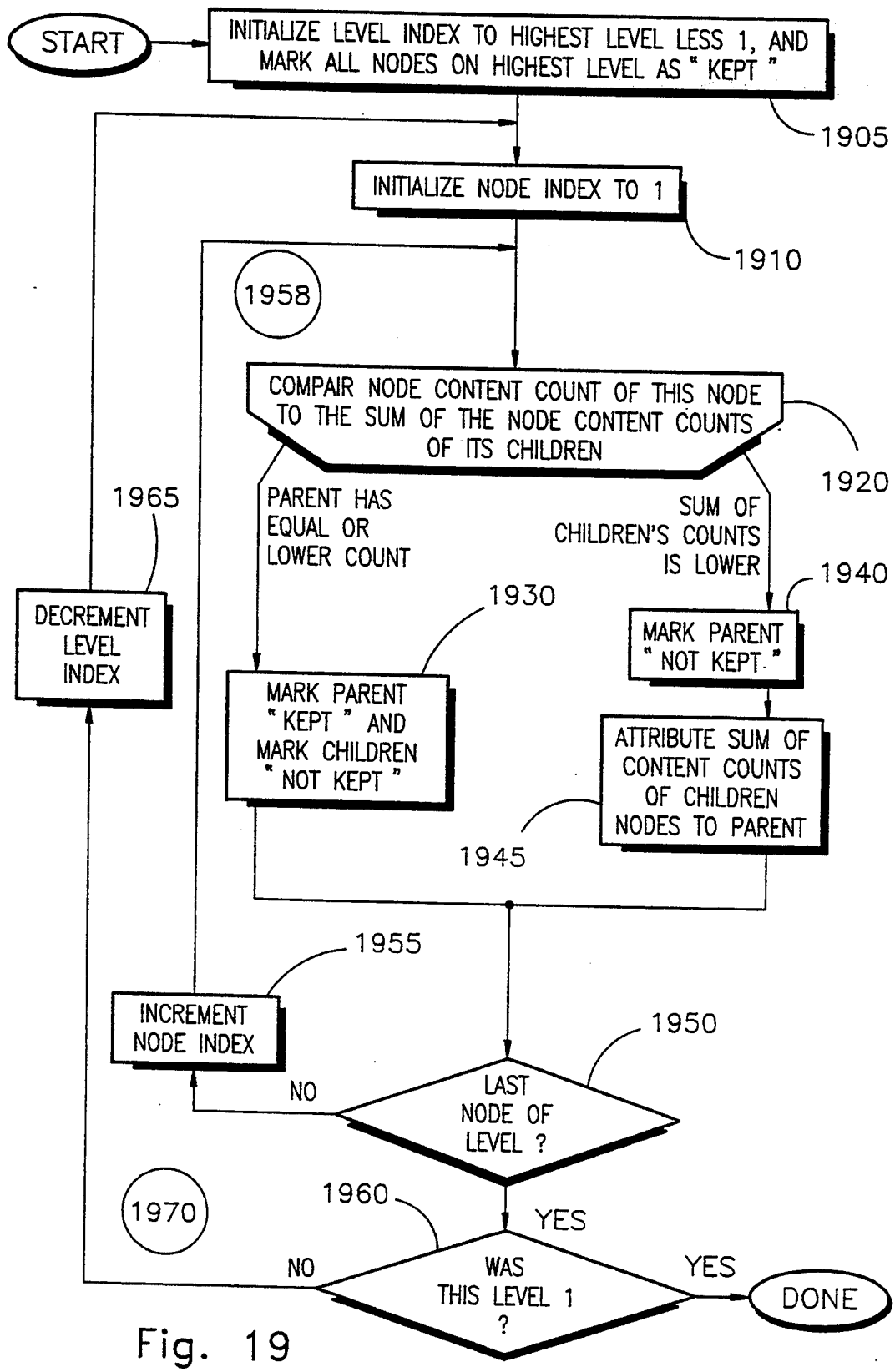
FIG. 19 is a routine for selecting an advantageous or best orthogonal basis.

Referring to FIG. 18, there is shown a flow diagram of the routine for computing the information cost of the nodes of the tree, sot hat an advantageous orthogonal basis can be selected. The block 1810 represents initializing the level index to the highest level (e.g., the last level in the illustration of FIG. 3). The node index and the position index are initialized at 1 (blocks 1815 and 1820). A node content count, which is used in the present embodiment to keep track of the number of processed values in a node that exceed a predetermined threshold, is initialized at zero, as represented by the block 1825. Inquiry is then made (diamond 1830) as to whether the value at the current position is less than a predetermined threshold value. If not, the node content count is incremented (block 1835), and the diamond 1840 is entered. If, however, the processed value at the current position is less than the threshold value, the diamond 1840 is entered directly. [At this point, the processed value could be set to zero prior to entry of diamond 1840 from the "yes" output branch of diamond 1830, but it is more efficient to handle this later.] Inquiry is then made (diamond 1840) as to whether the last position of the node has been reached. If not, the position index is incremented (block 1850), diamond 1830 is re-entered, and the loop 1855 is continued until all processed values of the current node have been considered. When this occurs, the node content count is stored for the current node (of the current level) as represented by the block 1860. Inquiry is then made (diamond 1865) as to whether the last node of the level has been processed. If not, the block 1870 is entered, the node index is incremented, the block 1820 is re-entered, and the loop 1875 is continued until all nodes of the current level have been considered. Inquiry is then made (diamond 1880) as to whether the current level is the highest level. If so, there is no higher level against which comparison of parent-to-children node comparisons can be made. In such case, the level index is incremented (block 1885), block 1815 is re-entered, and the procedure just described is repeated to obtain and store node content counts for each node of the next-to-highest level. When this has been done, the inquiry of diamond 1880 will be answered in the negative, and the next routine (FIG. 19) will be operative to compare the level (which has just been processed to compute information cost of each node) with the children nodes of the previously processed higher level.

In particular, the level index is initialized (block 1905) to the highest level less one, and all nodes on the highest level are marked "kept". The node index is initialized (block 1910) and the node content count of the current node of the current level is compared (block 1920) to the sum of the node content counts of the two nodes which are children of the current node. [For example, if the current node is $N_i$ and the current level is $L_j$, then the count for the current node is compared to the sum of the counts for nodes $N_{2i-1}$ and $N_{2i}$ of Level $L_{j+1}$.] If the comparison shows that the parent has an equal or lower count, the parent is marked "kept", and the two children nodes are marked "not kept" (as represented by the block 1930). Conversely, if the comparison shows that the sum of two children nodes has a lower count than the parent node, each of the children nodes keeps its current mark, and the current parent node is marked "not kept" (as represented by the block 1940). In the case where the children nodes are preferred, the sum of the counts of the children nodes are attributed to the parent node (block 1945). By so doing, the lowest count will be used for subsequent comparisons as ancestors are examined. The attribution of the count to the parent node will not be problematic, since only "kept" nodes will be considered in the next stage of processing. Inquiry is then made (diamond 1950) as to whether the last node of the current level has been reached. If not, the node index is incremented (block 1955), block 1920 is re-entered, and the loop 1958 is continued until all nodes at the current level have been considered. Inquiry is then made (diamond 1960) as to whether the current level is level 1. If not, the level index is decremented (block 1965), block 1815 (FIG. 18) is re-entered, and the loop 1970 continues until all levels have been considered. At this point, the nodes which define the basis to be used have been marked "kept" [possibly together with some of their descendent nodes], and correspond, for example, to the shaded nodes of the FIG. 4 illustrations.

Figure 20:
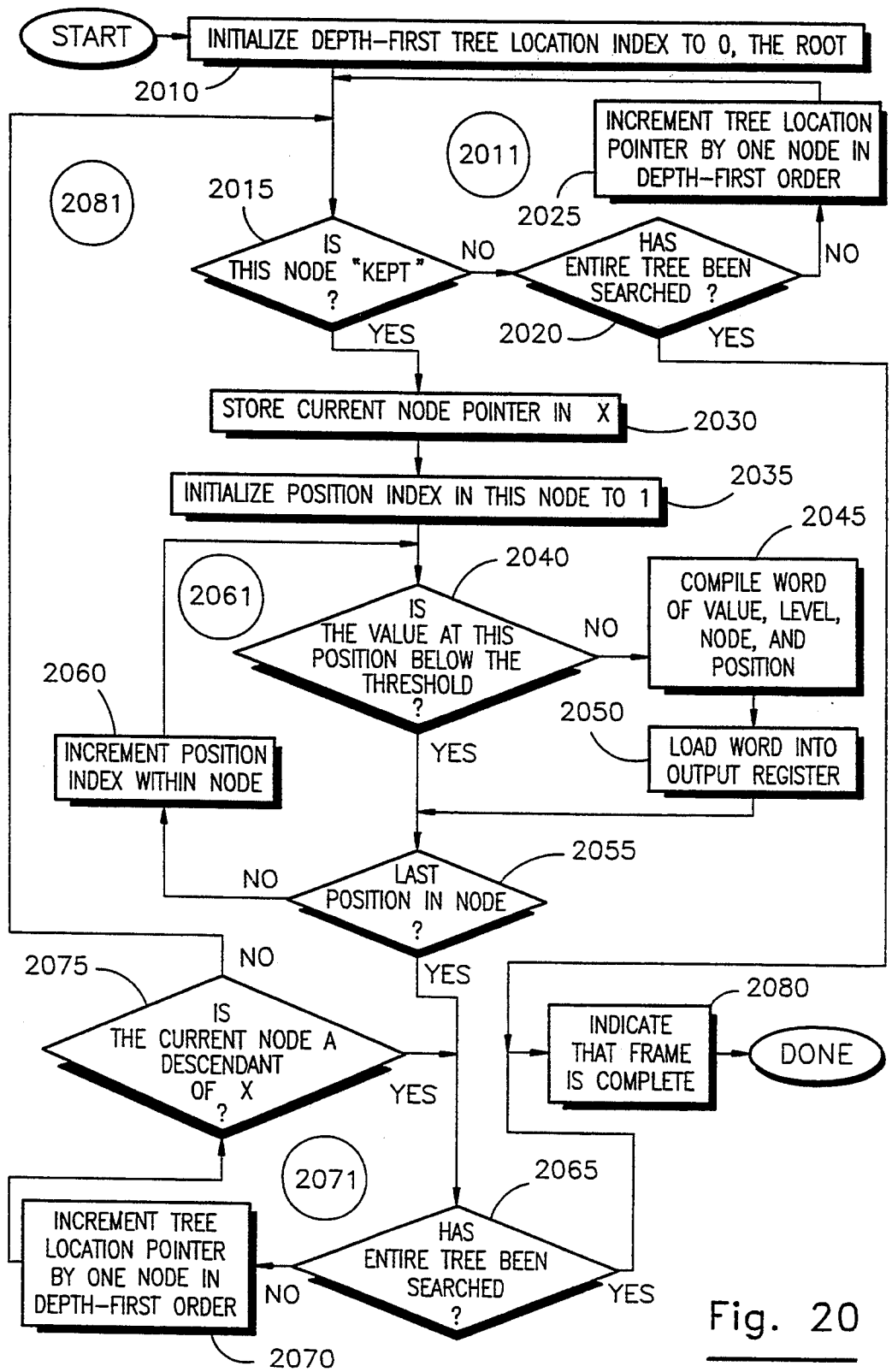
FIG. 20 is a flow diagram of a routine for generating output encoded words.

Referring to FIG. 20, there is shown a flow diagram of a routine for generating output encoded words which, in the present embodiment, are collected in a frame which represents the encoded form of the data $x_1, x_2, x_3 \ldots x_n$. For example, for an acoustical signal, the frame may represent a particular number of acoustical samples, for example 256 samples. As a further example, for a video signal, the frame may represent a frame of video, portion thereof, or transformed frequency components thereof. The number of encoded words in a frame will generally vary as the information being encoded varies, and will also generally depend upon the level of the threshold employed, if a threshold is employed as in the present embodiment. FIG. 20 illustrates an embodiment of a routine for generating a frame of words for the basis that was selected using the routines of FIGS. 18 and 19. A tree location index will be calculated which points to nodes in the tree in depth-first order (or so-called "pre-order"), as is well known in the art. The tree location index is initialized to 1 at level 0, node 1 (block 2010). Inquiry is made (diamond 2015) as to whether the node at that tree location is market "kept", and, if not, diamond 2020 is entered directly, and inquiry is made as to whether the entire tree has been examined, as indicated by the tree location index. If the entire tree has been searched, block 2080 is entered and a "frame complete" indication can be generated. If not, then loop 2011 is continued until a node marked "kept" is encountered, or until the entire tree has been searched. If a node marked "kept" is encountered, block 2030 is entered, and the tree location index of this "kept" node is recorded in memory; suppose for example that it is called "X". The position index in the node is initialized (block 2035). Inquiry is then made (diamond 2040) as to whether the value at the current position is above the predetermined threshold. If not, diamond 2055 is entered directly, and no word is generated for the value at the current position. If the value is above the threshold, block 2045 is entered, this block representing the generation of a word which includes the current level, node, and position, and the value at the position. The block 2050 is then entered, this block representing the loading of the just generated word into an output register. Inquiry is then made (diamond 2055) as to whether the last position in the current node has been reached. If not, the position is incremented (block 2060), diamond 2040 is re-entered, and the loop 2061 is continued until all positions in the node "X" have been considered. It will be understood that various formats can be used to represent the words. For example, a specific number of bits can be used for each of the level, node, position, and value. Alternatively, words could be of different length, e.g. depending on information content or entropy, with suitable delineation between words, as is known in the art. Also, if desired, all words in a particular node could be encoded with a single indication of level and node, with individual indications of position-value pairs. Inquiry is next made (diamond 2070), as to whether the last node location in the tree in depth-first order has been reached. If not, the tree location index is incremented (block 2070), and inquiry is made as to whether the new node is a descendant of "X", by a comparison of depth-first indices well known in the art. When this is the case, diamond 2065 is re-entered, and the loop 2071 is continued until the first node which is not a descendant of "X" is encountered, or until there are no more nodes. When a first non-descendant of "X" is encountered, diamond 2015 is re-entered and the loop 2081 is continued until all nodes which are both marked "kept" and have no ancestors marked "kept" have contributed to the frame. Such nodes contain a complete orthogonal group of wavelet-packet correlations (see also Appendix I, II and V). When either loop 2011 or the loop 2071 terminates by exhaustion of the nodes, block 2080 is entered and a "frame complete" indication can be generated. If desired, the frame can then be read out of the encoder register. However, it will be understood that the encoder register can serve as a buffer from which words can be read-out synchronously or asynchronously, depending on the application.

Figure 21:
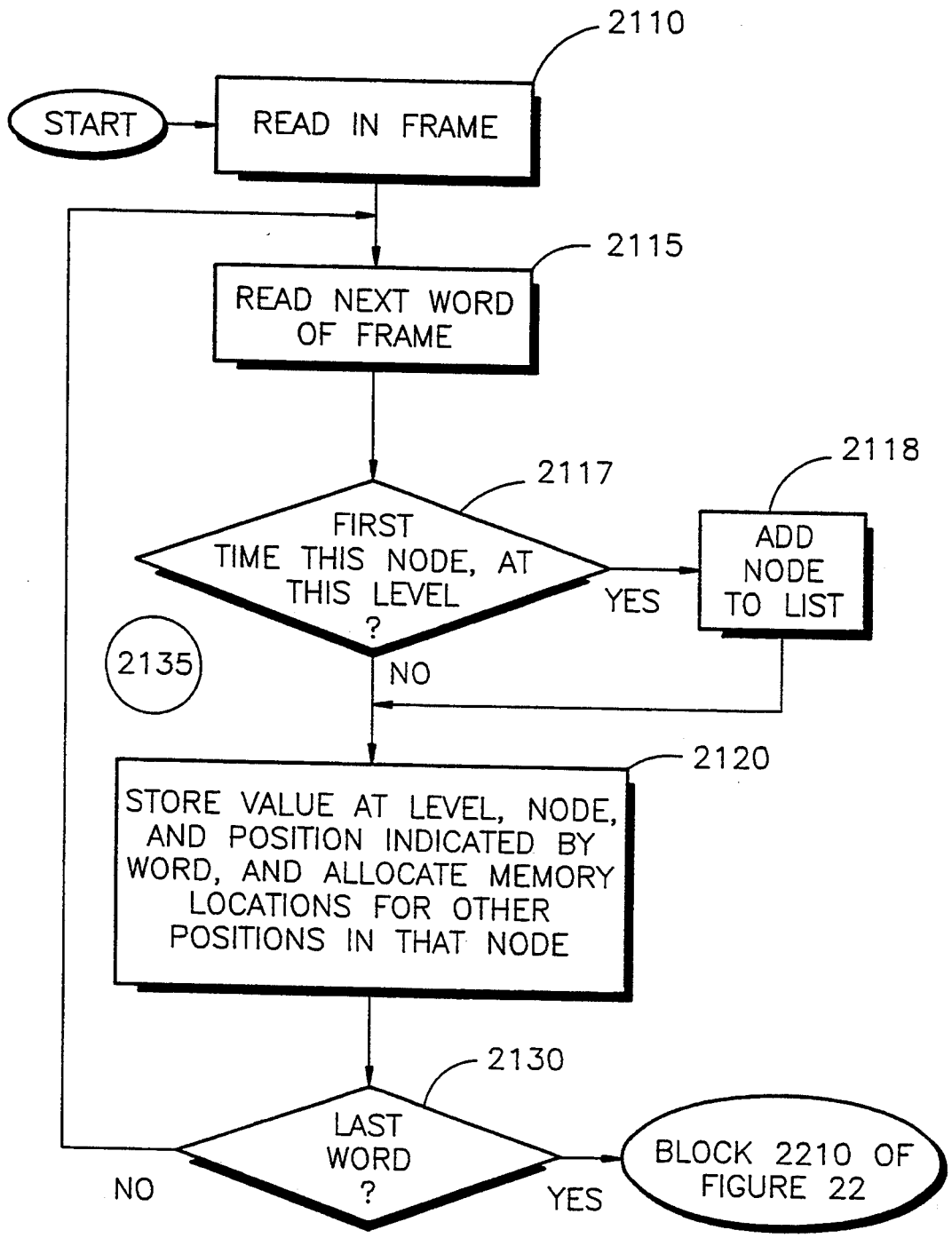
FIG. 21 is a flow diagram of the decoder routine for processing frames of words and reconstructing the orthogonal basis indicated by the words of a frame.

Referring to FIG. 21, there is shown a flow diagram of the decoder routine for processing frames of words and reconstructing the orthogonal basis indicated by the words of a frame. The block 2110 represents the reading in of the next frame. In the described embodiment, it is assumed that the frames of words are read into a buffer (e.g. associated with decoder processor subsystem 170 of FIG. 1), and the individual words processed sequentially by placement into appropriate addresses (which can be visualized as the selected basis nodes of a tree—as in FIG. 4), from which reconstruction is implemented in the manner to be described. However, it will be understood that individual words can be received synchronously or asynchronously, or could be output in parallel into respective tree nodes, if desired. Also, as was the case with the encoder, parallel processing or network processing could be employed to implement reconstruction, consistent with the principles hereof. In the routine of FIG. 21, the next word of the frame is read (block 2115), and a determination is made as to whether the node and level of the word is occurring for the first time (diamond 2117). If so the node (and its level) is added to the list of nodes (block 2118). The value indicated in the word is stored (block 2120) at a memory location indicated by the level, node, and position specified in the word. It will be understood that memory need be allocated only for positions within the nodes designated by the read-in words. Inquiry is then made (diamond 2130) as to whether the last word of the frame has been reached. If not, the block 2115 is re-entered, and the loop 2135 is continued until all words of the frame have been stored at appropriate locations. It will be understood that, if desired, the word locations (level, node, and position) could alternatively be stored, and the values subsequently recovered by pointing back to their original storage locations.

Figure 22:
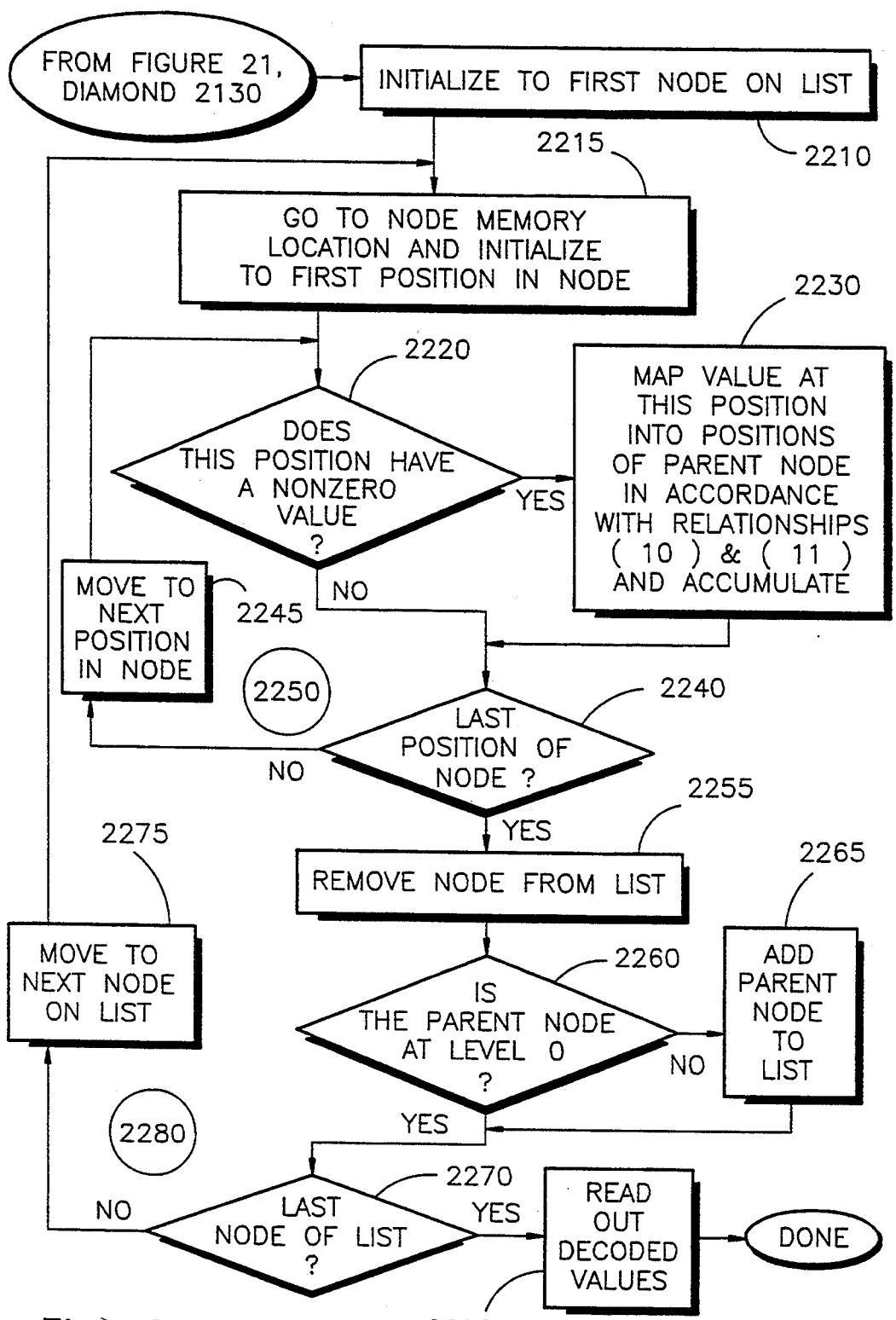
FIG. 22 is a further portion of the routine for reconstruction in the decoder.

During the next portion of the decoder routine, as shown in FIG. 22, the values in the nodes on the list are utilized to implement reconstruction as in the diagram of FIGS. 15A and 15B, with parent nodes being reconstructed from children nodes until the level zero information has been reconstructed. During this procedure, when a parent node is reconstructed from its children nodes, the parent node is added to the list of nodes, so that it will be used for subsequent reconstruction. This part of the procedure begins by initializing to the first node on the list (block 2210). Next, the block 2215 represents going to the memory location of the node and initializing to the first position in the node. Inquiry is then made (diamond 2220) as to whether there is a non-zero value at the position. If not, diamond 2240 is entered directly. If so, the value at the position is mapped into the positions of the parent node, with accumulation, as described above in conjunction with relationships (10) and (11). Inquiry is then made (diamond 2240) as to whether the last position of the node has been reached. If not, the next position in the node is considered (block 2245), diamond 2220 is re-entered, and the loop 2250 continues until all positions in the node have been considered. It will be understood that, if desired, a marker or vector can be used to indicate strings of blank positions in a node, or to point only to occupied positions, so that a relatively sparse node will be efficiently processed. In this regard, reference can be made to the abovereferenced copending U.S. patent application Ser. No. 525,974, filed of even date herewith. When the last position of the node has been considered, the node is removed from the list of nodes, as represented by block 2255, and inquiry is made (diamond 2260) as to whether the parent node is at level 0. If so, diamond 2270 is entered directly. If, however, the parent node is not at level 0, the parent node is added to the list of nodes (block 2265). Inquiry is then made (diamond 2270) as to whether the last node on the list has been reached. If not, the next node on the list is considered (block 2275), block 2215 is re-entered, and the loop 2280 is continued until processing is complete and the reconstructed values have been obtained. The decoder output values can then be read out (block 2290).

It will be understood that similar techniques can be employed at higher dimensions and in other forms (see e.g. Appendix V). More complicated tree structures, such as where a node has more than two children (e.g. Appendices II and V) can also be utilized.

The invention has been described with reference to particular preferred embodiments, but variations within the spirit and scope of the invention will occur to those skilled in the art. For example, it will be recognized that the wavelet upon which the wavelet-packets are based can be changed as different parts of a signal are processed. Also, the samples can be processed as sliding windows instead of segments.

APPENDIX I

Construction of Wavelet-Packets

We introduce a new class of orthonormal bases of $L^2(R^n)$ by constructing a "library" of modulated wave forms out of which various bases can be extracted. In particular, the wavelet basis, the walsh functions, and rapidly oscillating wave packet bases are obtained.

We'll use the notation and terminology of [D], whose results we shall assume.

§1. We are given an exact quadrature mirror filter h(n) satisfying the conditions of Theorem (3.6) in [D], p. 964, i.e.

$$\Sigma h(n - 2k)h(n - 2l) = \delta_{k,l}, \; \Sigma h(n) = \sqrt{2}\;.$$

we let $g_k = h_{k+1}(-1)^k$ and define the operations $F_i$ on $l^2(Z)$ into "$l^2(2Z)$"

$$F_0\{s_k\}(i) = 2\Sigma s_k h_{k-2i} \qquad (1.0)$$

$$F_1\{s_k\}(i) = 2\Sigma s_k g_{k-2i}.$$

The map $F(s_k) = F_0(s_k) \oplus F_1(s_k) \in l^2(2Z) \oplus l^2(2Z)$ is orthogonal and $$F_0^* F_0 + F_1^* F_1 = I \qquad (1.1)$$

We now define the following sequence of functions.

$$\begin{cases} W_{2n}(x) = \sqrt{2} \; \Sigma h_k W_n(2x - k) \\ W_{2n+1}(x) = \sqrt{2} \; \Sigma g_k W_n(2x - k) \end{cases} \qquad (1.2)$$

Clearly the function $W_0(x)$ can be identified with the function $\phi$ in [D] and $W_1$ with the function $\Psi$.

Let us define $$m_0(\xi) = \frac{1}{\sqrt{2}} \Sigma h_k e^{-ik\xi}$$

and $$m_1(\xi) = -e^{i\xi}\overline{m_0}(\xi + \pi) = \frac{1}{\sqrt{2}} \Sigma g_k e^{ik\xi}$$

Remark: The quadrature mirror condition on the operation $F = (F_0, F_1)$ is equivalent to the unitarity of the matrix $$M = \begin{bmatrix} m_0(\xi), & m_1(\xi) \\ m_0(\xi + \pi), & m_1(\xi + \pi) \end{bmatrix}$$

Taking Fourier transform of (1.2) when $n = 0$ we get $$\hat{W}_0(\xi) = m_0(\xi/2)\hat{W}_0(\xi/2)$$

i.e., $$\hat{W}_0(\xi) = \prod_{j=1}^{\infty} m_0(\xi/2^j)$$

and $$\hat{W}_1(\xi) = m_1(\xi/2)\hat{W}_0(\xi/2) = m_1(\xi/2)m_0(\xi/4)m_0(\xi/2^3)\cdots$$

More generally, the relations (1.2) are equivalent to $$\hat{W}_n(\xi) = \prod_{j=1}^{\infty} m_{\epsilon_j}(\xi/2^j) \qquad (1.3)$$

and $$n = \sum_{j=1}^{\infty} \epsilon_j 2^{j-1} \; (\epsilon_j = 0 \text{ or } 1).$$

We can rewrite (1.1) as follows.

$$W_{2n}(x - l) = \sqrt{2} \; \Sigma h_{j-2l} W_n(2x - j) = F_0\{W_n(2x - j)\}(l) \qquad (1.4)$$

$$W_{2n+1}(x - l) = \sqrt{2} \; \Sigma g_{j-2l} W_n(2x - j) = F_1\{W_n(2x - j)\}(l)$$

where $W_n(2x - j)$ is viewed as a sequence in j for (x,n) fixed. Using (1.1) we find:

$$W_n(x - j) = \qquad (1.5)$$

since $L^2 = \Sigma \oplus \ _{2l} \oplus \Sigma \oplus \ _{2l+1}$, we have a complete basis.

These can be generalized as follows.

THEOREM (2.3). Let a collection $\{l, n\}$ be given such that the dyadic intervals $I_{l,n} = [2^l n, 2^l(n+1))$ form a disjoint covering of $(0, \infty)$, then $2^{l/2} W_n(2^l x - k)$ form a complete orthonormal basis of $L^2(R)$.

This theorem becomes obvious in the following case. Let $$m_0(\xi) = \begin{cases} 1 & |\xi| < \frac{\pi}{2} \\ 0 & \frac{\pi}{2} \leq |\xi| < \pi \end{cases}$$

a periodic function of period $2\pi$, and $m_1(\xi) = 1 - m_0(\xi)$. Let $$\hat{w}_n(\xi) = \prod_{j=1}^{\infty} m_{\epsilon_j}(\xi/2^j) \quad n = \sum_{1}^{\infty} \epsilon_j 2^{j-1}$$

then $$\hat{w}_n(\xi) = \begin{cases} 1 & n \leq |\xi/\pi| < n+1 \\ 0 & \text{elsewhere} \end{cases}$$

and the orthonormal basis $\omega_n(x-k)$ in Fourier space is $$e^{ik\xi} \hat{\omega}_n(\xi)$$

which is the simplest variation on a "windowed" (2 windows) Fourier transform. Theorem (1.4) is obvious in this case. This theorem is also easy to understand from the point of view of subband coding as we shall see.

§3. Subband coding and expansions in terms of $W_n$

We assume, given a function which, on the scale $2^{-N}$, is well approximated as $$f(x) = \Sigma s_k^0 W_0(2^N x - k) 2^{N/2} \quad (3.1)$$

as seen in (1.8)

$$f(x) = \frac{1}{\sqrt{2}} \Sigma \left\{ F_0(s_k^0)(i) W_0\left(\frac{x2^N}{2} - i\right) + F_1(s_k^0)(i) W_1\left(\frac{x2^N}{2} - i\right) \right\} 2^{N/2} \quad (3.2)$$

$$= \left\{ \frac{1}{\sqrt{2}} f_0\left(\frac{x}{2} 2^N\right) + \frac{1}{\sqrt{2}} f_1\left(\frac{x}{2} 2^N\right) \right\} 2^{N/2} \text{ with } f_0 \in \Omega_0, f_1 \in \Omega_1$$

The coefficients of $f_0$ are given by $F_0(s^0)$
The coefficients of $f_1$ are given by $F_1(s^0)$.
Continuing an application of (1.8) gives $$= \frac{2^{N/2}}{2} \left\{ f_{00}\left(\frac{x}{4} 2^N\right) + \right.$$

-continued $$\left. f_{10}\left(\frac{x}{4} 2^N\right) + f_{01}\left(\frac{x}{4} 2^N\right) + f_{11}(x 2 2^N) \right\}$$

where $f_{00}$, $f_{10}$ are obtained by decomposing $f_0$ and $f_{01}$, $f_{11}$ are obtained by decomposing $f_1$
$f_{00} \in \Omega_0$, $f_{10} \in \Omega_1$, $f_{01} \in \Omega_2$, $f_{11} \in \Omega_3$. If we continue this decomposition and observe that the binary tree corresponds to the realization of n as $$n = \sum_{1}^{l} \epsilon_j 2^{j-1}$$

and that after $l$ iterations we get $$f(x) = 2^{(N-l)/2} \sum_{k=0}^{2^l-1} f_n(x 2^{N-l}) \text{ with } f_n \in \Omega_n. \quad (3.3)$$

and $$f_n(x) = \sum_k \langle f, W_n(2^{N-l} x - k) \rangle W_n(2^{N-l} x - k) 2^{N-l}$$

with $$2^{\frac{N-l}{2}} \langle f, W_n(2^{N-l} - k) \rangle = F_{\epsilon_l} F_{\epsilon_2} \ldots F_{\epsilon_l} \{s_k^0\} \quad (3.4)$$

$$n = \Sigma \epsilon_j 2^{j-1}.$$

We therefore obtain a fast $2^N N$ algorithm to calculate all coefficients for "all functions in our library" for scales $-N \leq j \leq 0$. The procedure is analogous to subband coding.

§4. Higher dimensional libraries and bases

We define the higher dimensional wavelet basis as follows: Let $$\mathcal{W}_1 = \text{span}\{W_0(x_1-k_1)W_1(x_2-k_2),$$
$$W_1(x_1-k_1)W_0(x_2,k_2), W_1(x_1-k_1)W_1(x_2-k_2)\}$$

$\mathcal{W}_k = \delta^k \mathcal{W}_1$ were $\delta f(x_1 x_2) = 2f(2x_1, 2x_2)$. Clearly $L^2(R^2) = \Sigma \mathcal{W}_k$.

The basic 2-dimensional "library" consists of all functions obtained as tensor products of the one dimensional library i.e., $$2^{\frac{1}{2}(j_1+j_2)} W_{n_1}(2^{j_1} x_1 - k_1) W_{n_2}(2^{j_2} x_2 - k_2).$$

We will restrict our attention to the sublibraries obtained by dilating both variables by the same dilations although the case $j_2 = rj_1$ $r$ fixed is of independent interest.

The two dimensional basis corresponding to Theorem (2.1) is given in

THEOREM (4.1): Fix $l$, then for $(k_1, k_2) \in Z^2$ $j \in Z$ $2^l \leq n < 2^{l+1}$, $$2^{j/2} W_n(2^j x_1 - k_1) 2^{\frac{j+l}{2}} W_0(2^{l+j} x_2 - k_2)$$

$$2^{\frac{(j+l)}{2}} W_0(2^{l+j} x_1 - k_1) 2^{j/2} W_n(2^j x_2 - k_2)$$

$$2^j W_{n_1}(2^j x_1 - k_1) W_{n_2}(2^j x_2 - k_2) \ 2^l \leq n_i < 2^{l+1}$$

form an orthonormal basis of $L^2$.

THEOREM (4.2). Let $<n>=<n_1,n_2>=2^{max(l(n_1)l(n_2))}$ where $l(n_1)=[\log_2 n_1]$ $n_1 \geq 0$ $n_2 \geq 0$ then for $(k_1, k_2) \in Z^2$, $$<n> \cdot W_{n_1}(<n>x_1-k_1)W_{n_2}(<n>x_2-k_2)$$

$$<2n>W_{n_1}(2<n>x_1-k_1)W_{n_2}(2<n>x_2-k_2)$$

form an orthonormal basis (wave packet basis of $L^2(R^2)$).
PROOF: Assume $1=\max(l(n_1)l(n_2))=l(n_2)$, i.e. $n_1 \leq n_2$. Then $$2^l W_{n_1}(2^l x_1-k_1)W_{n_2}(2^l x_2-k_2)$$

for $$0 \leq n_1 < 2^l \, 2^l \leq n_2 < 2^{l+1}$$

span (using 1.9) Proposition (1.1) $\delta^{2l}\Omega_{0,x_1} \otimes \delta^{2l}\Omega_{1,x_2}$ i.e., the subspace spanned by $W_0(2^{2l}x_1-k_1)W_1(2^{2l}x_2-k_2)$. Consideration of the other 2 cases yields a total span of $\mathcal{W}_{2l}$, similarly we obtain $\mathcal{W}_{2l+1}$ and the theorem is proved.

[D] Ingrid Daubechies, *Orthonormal bases of compactly supported wavelets*, C. P. A. M. XLI (1988), 909–966.

APPENDIX II

Best-Adapted Wavelet-Packet Bases

Introduction. By using more filters, it is possible to introduce fast wave packet transformations which decimate by arbitrary numbers. These generalize algorithms which decimate by 2. The method produces new libraries of orthonormal basis vectors appropriate for numerical harmonic analysis.

Aperiodic filters and bases in $l^2$. Consider first the construction of bases on $l^2$. Let p be a positive integer and introduce p absolutely summable sequences $f_0, \ldots, f_{p-1}$ satisfying the properties:
  (1) For some $\epsilon > 0$, $\Sigma_m |f_i(m)| \, ||m|^\epsilon < \infty$,
  (2) $\Sigma_m f_0(m) = 1$, for $i=0, 1, \ldots, p-1$, and
  (3) $\Sigma_m f_i(m)f_j(m+kp) = \delta_{i-j}\delta_k$, where $\delta$ is the Kronecker symbol.

To these sequences are associated p convolution operators $F_0, \ldots, F_{p-1}$ and their adjoints $F_0^*, \ldots, F_{p-1}^*$ defined by $$F_i: l^2 \to l^2, \quad F_i v(k) = \sum_m f_i(m+pk)v(m),$$

$$F_i^*: l^2 \to l^2, \quad F_i^* v(m) = \sum_k f_i(m+pk)v(k).$$

These convolution operators will be called filters by analogy with quadrature mirror filters in the case $p=2$. They have the following properties:
PROPOSITION. For $i,j = 0, 1, \ldots, p-1$,
  (1) $F_i F_j^* = 0$, if $i \neq j$,
  (2) $F_i F_i^* = I$,
  (3) $F_i^* F_i$ is an orthogonal projection of $l^2$, and for $i \neq j$ the ranges of $F_i^* F_i$ and $F_j^* F_j$ are orthogonal, and
  (4) $F_0^* F_0 + \ldots + F_{p-1}^* F_{p-1} = I$.

PROOF: Properties (1) and (2) follow by interchanging the order of integration:

$$F_i F_j^* v(k') = \sum_m \sum_k f_i(m+pk')f_j(m+pk)v(k)$$

$$= \sum_k \left( \sum_{m'} f_i(m')f_j(m'+p[k-k']) \right) v(k)$$

$$= \sum_k \delta_{i-j}\delta_{k-k'}v(k)$$

$$= \begin{cases} v(k'), & \text{if } i = j, \\ 0, & \text{if } i \neq j, \end{cases}$$

by the orthogonality properties of $f_i$.

Property (3) follows from (1) and (2): $F_i^* F_i F_i^* F_i = F_i^* F_i$, and $F_i^* F_i F_j^* F_j = 0$. Orthogonality is easily shown by transposition.

To prove (4), let $m_j(\xi) = \Sigma_k f_j(k)e^{ik\xi}$ be the (bounded, Hölder continuous, periodic) function determined by the filter $f_j$, for $j=0, \ldots, p-1$. Then $f_j(k) = \hat{m}_j(k)$ is a real number, and each $F_i^* F_i$ is unitarily equivalent to multiplication by $|m_i|^2$ on $L^2([0, 2\pi])$.

Now Plancherel's theorem gives $$\int_0^{2\pi} e^{ilp\xi} m_j(\xi) \overline{m_{j'}(\xi)} d\xi = \sum_k f_j(k)f_{j'}(k+lp) = \delta_{j-j'}\delta_l.$$

In particular, $|m_j|^2$ has integral 1, and the Fourier coefficient $(|m_j|^2)^\wedge(lp)$ vanishes if $l \neq 0$. This is equivalent to the average of $|m_j(\xi)|^2$ over $\xi, \xi+2\pi/p, \ldots, \xi+2\pi(p-1)/p$ being identically 1.

The same vanishing is true of the Fourier coefficients of the cross terms $m_j \overline{m_{j'}}$, and for those it also holds when $l=0$. Thus the average of $m_j(\xi)\overline{m_{j'}(\xi)}$ over $\xi, \xi+2\pi/p, \ldots, \xi+2\pi(p-1)/p$ vanishes identically. Hence, the conditions of the filters $f_i$ are equivalent to the unitarity of the matrix $$\begin{pmatrix} m_0(\xi) & m_0\left(\xi + \frac{2\pi}{p}\right) & \ldots & m_0\left(\xi + \frac{2\pi(p-1)}{p}\right) \\ \ldots & & & \ldots \\ m_{p-1}(\xi) & \ldots & & m_{p-1}\left(\xi + \frac{2\pi(p-1)}{p}\right) \end{pmatrix}$$

But then $\Sigma_{k=0}^{p-1} |m_k(\xi)|^2 = 1$ for all $\xi$. Thus $F_0^* F_0 + \ldots + F_{p-1}^* F_{p-1}$ is unitarily equivalent to multiplication by 1 in $L^2([0, 2\pi])$, proving (4). ∎

With this proposition we can decompose $l^2$ into mutually orthogonal subspaces $W_0^1 \perp \ldots \perp W_{p-1}^1$, where $W_i^1 = F_i^* F_i(l^2)$ for $i=0, \ldots, p-1$. The map $F_i$ finds the coordinates of a vector with respect to an orthonormal basis of $W_i^1$. Since each $F_i W_i^1 = F_i(l^2)$ is another copy of $l^2$, there is nothing to prevent us from reapplying the filter convolutions recursively. At the mth stage, we obtain $l^2 = W_0^m \perp \ldots \perp W_{p^m-1}^m$, where $W_n^m = F_{n1}^* \ldots F_{nm}^* F_{nm} \ldots F_{n1}(l^2)$ and $n_m \ldots n_1$ is the radix-p representation of n. The map $F_{nm} \ldots F_{n1}$ transforms into standard coordinates in $W_n^m$. For convenience, we will introduce the notations $F_n^m = F_{nm} \ldots F_{n1}$, and $F_n^{m*} = F_{n1}^* \ldots F_{nm}^*$.

The subspaces $W_n^m$ for a p-ary tree as shown in FIG. 1. Every node $W_n^m$ is a parent with p daughters $W_{pn}^{m+1}, \ldots, W_{pn+p-1}^{m+1}$. The root of the tree is the original space $l^2$, which we may label $W_0^0$ for consistency. Call the whole tree W.

Now fix m and suppose $\omega$ belongs to $W_n^m$, where $0 \leq i \leq p^m - 1$, and $F_n^m \omega = e_k$ is the elementary sequence with 1 in the kth position and 0's elsewhere. The collection of all such $\omega$ forms an orthonormal basis of $l^2$ with some remarkable properties. In particular, if $p=2$ and the filters $F_0$ and $F_1$ are taken as low-pass and high-pass quadrature mirror filters, respectively, then the spaces $W_0^m, \ldots, W_{2^m-1}^m$ are all the subbands at level m. These have been used for a long time in digital signal processing and compression. An earlier paper [W] described experiments with an algorithm for choosing m so as to reduce the bit rate of digitized acoustic signal transmission. This produced good signal quality at rather low bit rates.

The tree in FIG. 1 contains other orthogonal bases of $W_0^0$. In face, it forms a library of bases which may be adapted to classes of functions. The tree structure allows the library to be searched efficiently for the extremum of any additive functional.

To every node in W we associate the subtree of all its descendants. Define a graph to be any subset of the nodes of W with the property that the union of the associated subtrees is disjoint and contains a complete level $W_0^m, \ldots, W_{p^m-1}^m$ for some m. The singleton $W_0^0$ is a graph, for example, with $m=0$. The following may be called the graph theorem.

THEOREM. Every graph corresponds to a decomposition of $l^2$ into a finite direct sum.

PROOF: Every graph is a finite set, of cardinality no more than $p^m$ for the m in the definition. Fix a graph, and suppose that $W_{n_1}^{m_1}$ and $W_{n_2}^{m_2}$ are subspaces corresponding to two nodes. Without loss, suppose that $m_1 \leq m_2$. When $W_{n_2}^{m_2}$ is contained in a subspace $W_n^{m_1}$ for some $n \neq n_1$. Since the subspaces at a given level are orthogonal, we conclude that $W_{n_2}^{m_2} \perp W_{n_1}^{m_1}$.

To show that the decomposition is complete, observe that a node contains the sum of its daughters. By induction, it contains the sum of all of the nodes in its subtree. Hence a graph contains the sum of all the subspaces at some level m. But this sum is all of $l^2$. ∎

THEOREM. Graphs are in one-to-one correspondence with finite disjoint covers of [0, 1) by p-adic intervals $I_n^m = p^{-m}[n, n+1)$, $n=0, 1, \ldots, p^m-1$.

PROOF: The correspondence is evidently $W_n^m \longleftrightarrow I_n^m$. The subtree associated to $W_n^m$ corresponds to all p-adic subintervals of $I_n^m$. The details are left to the reader. ∎

Analytic properties of graphs: continuous wave packets. Each filter $F_j$ (and its adjoint $F_j^*$) maps the class of exponentially decreasing sequences to itself. Likewise, the projections $F_n^{m*} F_n^m$ preserve that class. In practice, we shall consider only finite sequences in $l^2$. For actual computations the filters must be finitely supported as well. Convolution with such filters preserves the property of finite support. Let the support width of the filters be r, and let $z_m$ be the maximum width of any vector of the form $F_{j_1}^* \ldots F_{j_m}^* (e_k)$. Then $z_0 = 1$ and $z_{m+1} = pz_m + r - p$. By induction, we see that $z_m = p^m + (p^m - 1)(r - p)$.

Coifman and Meyer [CM] have observed that the basis elements $F_n^{m*} e_k$ are related to wave packets over R. A slightly generalized paraphrase of their construction follows. Many of the basic facts used were proved by Daubechies in [D].

Let $\omega$ be a function defined by $\hat{\omega}(\xi) = \Pi_{j=1}^{\infty} m_0(\xi/p^j)$, where $m_0$ is the analytic function defined by $F_0$, as above. Then $\omega$ has mass 1, decreases rapidly, and is Hölder continuous, as proved in [D]. If $m_0$ is a trigonometric polynomial of degree r, then $\omega$ is supported in the interval $[-r, r]$. Arranging that $\omega$ has r continuous derivatives requires $m_0$ with degree at most $O(r)$. See [D] for a discussion of the constant in this relation for $p=2$. Put $\omega_0^0 = \omega$, and define the family of wave packets recursively by the formula $\omega_{pn+j}^{m+1}(t) = \Sigma_{-\infty}^{\infty} f_j(i) \omega_n^m(pt-i)$. This produces one function $\omega_n^m$ for each pair (m, n), where $m = 0, 1, \ldots$ and $n = 0, 1, \ldots, p^m - 1$.

We can renormalize the wave packets to a fixed scale $p^L$. Write $$\omega_{n,m,k}^L(t) = p^{(L-m)/2} \omega_n^m(p^{L-m} t - k).$$

Then $\omega_{0,0,k}^L$ is a collection of orthonormal functions of mass 1, concentrated in intervals of size $O(p^{-L})$. This makes them suitable for sampling continuous functions. Let x(t) be any continuous function, and put $$s_0^0(k) = \langle x, w_{0,0,k}^L \rangle = \int_{-\infty}^{\infty} x(t) w_0^0(p^L t - k) dt.$$

We may use $s_0^0$ as a representative value of x(t) in the interval $I_k^L = p^{-L}[k, k+1)$. The closeness of the approximation to values of x depends, of course, on the smoothness of x. Suppose that x is Hölder continuous with exponent $\epsilon$. Then if $t_0$ is any point in $I_k^L$, we have $$|x(t_0) - s_0^0(k)| =$$

$$\left| \int_{I_k^L} (x(t_0) - x(t)) w_0^0(p^L t - k) dt \right| = O(p^{-\epsilon L}).$$

We can also taken advantage of differentiability of x if we construct $\omega_0^0$ with vanishing moments. Given d vanishing moments and d derivatives of x, the approximation improves to $|x(t_0) - s_0^0(k)| = O(p^{-dL})$.

The map $x \mapsto s_0^0$ sends $L^2(R)$ to $l^2$, and pulls back the orthonormal bases of $l^2$ constructed in the last section. To see this, define $s_n^m(k) = \langle x, \omega_{n,m,k}^L \rangle$. By interchanging the order of recurrence relation and inner product, we obtain the formula $s_n^m = F_n^m s_0^0$. Thus, the coordinates $s_n^m(k)$ are coefficients with respect to an orthonormal basis of $W_n^m$.

The resulting subspaces of $L^2(R)$ form a finer type of multiresolution decomposition than that of Mallat [Ma]. The coordinates $s_n^m(k)$ are rapidly computable. They contain a mixture of location and frequency information about x.

Ordering the basis elements. The parameters n, m, k, L in $\omega_{n,m,k}^L$ have a natural interpretation as frequency, scale, position, and resolution, respectively. However, n is not monotonic with frequency, because our construction yields wave packets in the so-called Paley (natural, or p-adic) ordering. The following results show how to permute $n \mapsto n'$ into a frequency-based ordering.

THEOREM. We may choose rapidly decreasing filters $F_0, \ldots, F_{p-1}$ such that $\omega_{n,m,k}^L$ is concentrated near the interval $I_k^{L-m}$, and $\hat{\omega}_{n,m,k}^L$ is concentrated near the interval $I_{n'}^m$, where $n \mapsto n'$ is a permutation of the integers.

PROOF: The first part is evident. For any family of exponentially decreasing filters, $\omega_0^0$ decreases exponentially away from [0,1). $\omega_{0,m,k}^L$ is its dilate and translate to the interval $I_k^{L-m}$. Likewise, $\omega_{n,m,k}^L$ has the same concentration as $\omega_{0,m,k}{}^L$, since all the filters $F_i$ are uniformly exponentially decreasing.

The second part follows from the Fourier transform of the recurrence relation:

$$\hat{w}_{pn+j}^{m+1}(\xi) = \left(p^{-1} \sum_k f_j(k) e^{-ix\xi/p}\right) \hat{w}_n^m(\xi/p) = p^{-1} m_j(\xi/p) \hat{w}_n^m(\xi/p),$$

where $m_j$ is the multiplier defined above. Recall that $\Sigma_{j=0}^{p-1}|m_j(\xi)|^2 \equiv 1$ and that $m_0(0)=1$. Thus, the periodic functions $|m_j|^2$ form a partition of unity into p functions, with 0 being in the support of $m_0$ alone.

Now suppose for simplicity that we have chosen filters in such a way that $$|m_j(\xi)| = \sum_{k=-\infty}^{\infty} \chi_{\pm \frac{\pi}{p}[j,j+1]}(\xi - 2\pi k).$$

Such $m_j$ may be approximated in $L^2((-\pi, \pi))$ as closely as we like by multipliers arising from exponentially decreasing filters. In this simple case, it is immediate that $\hat{\omega}_0{}^0(\xi) = m_0(\xi/p)|_{(-\pi,\pi)}$ is the characteristic function of $(-\pi, \pi)$, so that $\hat{\omega}_{0,0,0}{}^L$ is the characteristic function of $(-\pi p^L, \pi p^L)$. Likewise, $\hat{\omega}_{j,1,0}{}^L$ is the characteristic function of $\pi p^{L-1}(-j-1, -j] \cup \pi p^{L-1}[j, j+1)$. From the recurrence relation, we see that $\hat{\omega}_{n,m,0}{}^L$ will be the characteristic function of the union of the intervals $\pm \pi p^{L-m}[n', n'+1)$, where $n \mapsto n'$ is a permutation. These intervals cover $p^L(-\pi, \pi)$ as $n=0, \ldots, p^m-1$. The permutation $n \mapsto n'$ is given by the recurrence relation $$n' = n, \quad \text{if } n = 0, \ldots, p-1;$$

$$(np + j)' = \begin{cases} n'p + j, & \text{if } n' \text{ is even,} \\ n'p + (p-1) - j, & \text{if } n' \text{ is odd.} \end{cases}$$

Write $n_j$ for the jth digit of n in radix p, numbering from the least significant. Set $n_m = 0$ if n has fewer than m digits. Then the recurrence relation implies that $n_j' = \pi(n_{j+1}', n_j')$, where $$\pi(x,y) = \begin{cases} y, & \text{if } x \text{ is even,} \\ p-1-y, & \text{if } x \text{ is odd.} \end{cases}$$

For each value of the first variable, $\pi$ is a permutation of the set $\{0, \ldots, p-1\}$ in the second variable. Thus the map $n' \mapsto n$ and its inverse $n \mapsto n'$ are permutations of the integers. It is not hard to see that these are permutations of order 2 if p happens to be odd. Otherwise they have infinite order, as may be seen by considering an increasing sequence of integers $n'$ all of which have only odd digits in radix p. ∎

COROLLARY. With filters $F_0, \ldots, F_{p-1}$ chosen as above, we can modify the recurrence relation for $\omega_{n,m,k}{}^L$ such that $\hat{\omega}_{n,m,k}{}^L$ is concentrated near the interval $I_n{}^m$.

PROOF: Simply reorder the functions $\omega_n{}^m$ by using the alternative recurrence relation:

$$w_{pn+j}^{m+1}(t) = \begin{cases} \Sigma_k f_j(k) w_n^m(pt - k), & \text{if } n \text{ is even,} \\ \Sigma_k f_{p-1-j}(k) w_n^m(pt - k), & \text{if } n \text{ is odd.} \end{cases}$$

Since we are enforcing $n=n'$ at each level m, we are composing with the permutation defined above. Of course, this algorithm has complexity identical to the original. ∎

Periodic filters and bases for $R^d$. A sampled periodic function may be represented as a vector in $R^d$ for some d. In this case let p be any factor of d. Introduce as filters a family of p vectors $\{\bar{f}_i \in R^d, i=0, \ldots, p-1\}$. These are obviously summable. Suppose in addition that they are orthogonal as periodic discrete functions, i.e., that $\Sigma_{m=1}^d \bar{f}_i(m) \bar{f}_j(m+kp \bmod d) = \delta_{i-j} \delta_k$.

Let the associated convolution operators be $\{\bar{F}_0, \ldots, \bar{F}_{p-1}\}$, defined as above by $$\bar{F}_i : R^d \to R^{d/p}, \quad \bar{F}_i v(k) = \sum_{m=1}^d \bar{f}_i(m + pk \bmod d) v(m),$$

for $k = 1, 2, \ldots, d/p$, $$\bar{F}_i^* : R^{d/p} \to R^d, \quad \bar{F}_i^* v(m) = \sum_{k=1}^{d/p} \bar{f}_i(m + pk \bmod d) v(k),$$

for $m = 1, 2, \ldots, d$.

The reduction modulo d is intentionally emphasized. These operators satisfy conditions similar to those of aperiodic filters:

PROPOSITION.

(1) $\bar{F}_i \bar{F}_j^* = 0$, if $i \neq j$, (2) $\bar{F}_i \bar{F}_i^* = I_{d/p}$ (3) $\bar{F}_i^* \bar{F}_i$ is a rank $d/p$ orthogonal projection on $R^d$, and for $i \neq j$ the ranges of $\bar{F}_i^* \bar{F}_i$ and $\bar{F}_j^* \bar{F}_j$ are orthogonal, (4) $\bar{F}_0^* \bar{F}_0 + \ldots + \bar{F}_{p-1}^* \bar{F}_{p-1} = I_d$ where $I_d$ is the identity on $R^d$.

PROOF: The proof is nearly identical with the one in the aperiodic case. ∎

The decomposition suggested by equation (4) may be recursively applied to the p subspaces $R^{d/p}$ by using additional filter families. For $d = p_1 \ldots p_L$ and $0 \leq n < d$, we have a unique representation $n = n_1 + n_2 p_1 + n_3 p_2 p_1 + \ldots + n_L p_{L-1} \ldots p_1$, where $0 \leq n_i < p_i$. This defines a one-to-one correspondence between $\{0, \ldots, d-1\}$ and an index set of t-tuples $I = \{(n_1, \ldots, n_L) : 0 \leq n_i < p_i\}$. We can construct a basis of $R^d$ whose elements are indexed by I. For $n = (n_1, \ldots, n_L) \in I$, define $\bar{F}_n = \bar{F}_{n_L}{}^L \ldots \bar{F}_{n_1}{}^1$, where $\bar{F}$ is a family of $p_i$ periodic filters. Then $\bar{F}_n^* \bar{F}_n$ is an orthogonal projection onto a 1-dimensional subspace of $R^d$. This is shown by induction on the rank in (3). Now let $W_n{}^L$ be the range of this projection. The collection $\{u_n = \bar{F}_n^* 1 : n \in I\}$ of standard basis vectors of $W_n{}^L$ will be an orthonormal basis of $R^d$, and the map $\bar{F}_n : R_d \to R$ gives the component in the $u_n$ direction.

As before, we are not limited to the basis defined by the index set I. Products of fewer than L filters form orthogonal projections onto a tree of subspaces of $R^d$. A node arising from a product of m filters will correspond to the subspace $W_n{}^m = \bar{F}_n^* \bar{F}_n R^d$, where $n = n_1 + \ldots + n_m p_{m-1} \ldots p_1$ indexes a composition of m filters. The tree will be nonhomogeneous in general, although all nodes i levels from the root will have the same number $p_i$ of daughters. Define a nonhomogeneous graph as a finite union of nodes whose associated subtrees form a disjoint cover of some level $m \leq L$. A graph theorem holds for this tree of subspaces as well. It and its corollary may be stated as follows:

THEOREM. Every nonhomogeneous graph corresponds to an orthogonal decomposition of $R^d$. ∎

COROLLARY. Graphs are in one-to-one correspondence with finite disjoint covers of [0,1) by intervals of the form $I_n{}^m = (p_1 \ldots p_m)^{-1}[n, n+1)$. ∎

Any permutation of the prime factors of d gives a (possibly different) basis.

Existence and construction of filters. We can construct finitely supported filters of any support length. Longer support lengths allow more degrees of freedom. Let M be a positive integer and consider the problem of finding filters of length pM, i.e., p trigonometric polynomials $m_0, \ldots, m_{p-1}$ of degree pM for which the above matrix of values of $m_j$ is unitary. This amounts to finding a map from trigonometric polynomials of degree pM into the unitary group U(p).

Given any pair P, Q of (perfect reconstruction) quadrature mirror filters, we can build a family of $p = 2^q$ filters by taking all distinguishable compositions of P and Q of length q. Alternatively, we can take all distinguishable produts of q filters. This method serves to build filters for q-dimensional signals. Given a signal $s = s(x) = s(x_1, \ldots, x_q)$, and $J = j_q \ldots j_1$ radix 2, we can define $2^q$ filters $F_J$ by taking a one-dimensional filter for each dimension: $F_J s(x) = \Sigma_{k_1, \ldots, k_q} f_{j_1}(k_1 + px_1) \ldots f_{j_q}(k_q + px_q) s(k_1, \ldots, k_q)$. Such filters are useful for image processing and matrix multiplication.

Smooth filters. Some filter sequences have a smoothness property:

DEFINITION. A summable sequence f is a smooth filter (of rank p) if there is a nonzero solution $\phi$ in $L^1(R) \cap L^2(R) \cap C^\infty(R)$ to the functional equation $$\phi(x) = p^{1/2} \sum_m f(m) \phi(px + m).$$

A filter will be said to have smoothness degree r if it satisfies this definition with $C^\infty$ replaced by $C^r$. Daubechies has shown in [D] that finitely supported filters of any degree of smoothness may be constructed in the case p=2. An obvious consequence is that smooth filters exist in the case $p = 2^q$. For arbitrary p, we may construct a filter family as above subject to additional constraints.

A continuous $L^2$ solution to the functional equation (3) always exists for a sequence f satisfying the three conditions at the top of this article. Its Fourier transform may be constructed by iteration:

$$\hat{\phi}(\xi) = \hat{\phi}(0) \prod_{i=k}^{\infty} m(\xi/p^k),$$

where $m(\xi) = p^{-\frac{1}{2}} \Sigma_k f(k) e^{-ik\xi}$ is the multiplier corresponding to the filter convolution in the integral equation. If $\phi$ is nonzero, then $\phi(0) \neq 0$, so it may be assumed that $\phi(0) = 1$. Now the sequence $\{f(k)|k|^\epsilon\}$ converges absolutely, so $m(\xi)$ is Hölder continuous of degree $\epsilon$. But also, $m(0) = p^{\frac{1}{2}} \Sigma_k f(k) = 1$, so that for $\xi$ near 0 the estimate $|m(\xi) - 1| < C|\xi|^\epsilon$ holds. This implies that the infinite product converges.

REFERENCES

[CW] R. R. Coifman and Y. Meyer, *Nouvelles bases othonormées de L (R) ayant la structure du système de Walsh*, preprint, Yale University, New Haven (1989).

[D] Ingrid Daubechies, *Orthonormal bases of compactly supported wavelets*, Communications on Pure and Applied Mathematics XLI (1988), 909–996.

[Ma] Stephane G. Mallat, *A Theory for Multiresolution Signal Decomposition: The Wavelet Decomposition*, IEEE Transactions on Pattern Analysis and Machine Intelligence 11, 674–693.

APPENDIX III

Nonstandard Matrix Multiplication

Wave packets. Define wave packets over $1^2$ in the usual way. For a pair $P = \{p_i\}$, $Q = \{q_i\}$ of quadrature mirror filters (QMFs) satisfying the orthogonality and decay conditions stated in [CW], there is a unique solution to the functional equation $$\phi(t) = \sqrt{2} \sum_{j \in Z} p_j \phi(2t - j).$$

Put $\omega = \omega_{0,0,0} = \phi$, and define recursively $$w_{2n,0,0}(t) = \sqrt{2} \sum_{j \in Z} p_j w_{n,0,0}(2t - j),$$

$$w_{2n+1,0,0}(t) = \sqrt{2} \sum_{j \in Z} q_j w_{n,0,0}(2t - j).$$

Then sat $\omega_{nmk}(t) = 2^{m/2} \omega_{n00}(2^m t - k)$. Write $\mathcal{W}(R) = \{\omega_{nmk} : n, m, k \in Z\}$ for the collection of functions so defined, which we shall call wave packets.

The quadrature mirror filters P, Q may be chosen so that $\mathcal{W}(R)$ is dense in many common function spaces. With the minimal hypotheses of [CW], $\mathcal{W}(R)$ will be dense in $L^2(R)$. Using the Haar filters $P = \{1/\sqrt{2}, 1/\sqrt{2}\}$, $Q = \{1/\sqrt{2}, -1/\sqrt{2}\}$ produces $\mathcal{W}(R)$ which is dense in $L^p(R)$ for $1 < p < \infty$. Longer filters can generate smoother wave packets, so we can also produce dense subsets of Sobolev spaces, etc.

Basis subsets. Define a basis subset $\sigma$ of the set of indices $\{(n, m, k) \in Z^3\}$ to be any subcollection with the property that $\{\omega_{nmk} : (n, m, k) \in \sigma\}$ is a Hilbert basis for $L^2(R)$. We characterize basis subsets in [W1]. Abusing notation, we shall also refer to the collection of wave packets $\{\omega_{nmk} : (n, m, k) \in \sigma\}$ as a basis subset.

Since $L^2 \cap L^p$ is dense in $L^p$ for $1 \leq p < \infty$, with certain QMFs a basis subset will also be a basis for $L^p$. Likewise, for nice enough QMFs, it will be a Hilbert basis for the various Sobolev spaces.

Since $L^2(R) \otimes L^2(R)$ is dense in $L^2(R^2)$, the collection $\{\omega_X \oplus \omega_Y : \omega_X \in \mathcal{W}(X), \omega_Y \in \mathcal{W}(Y)\}$ is dense in the space of Hilbert-Schmidt operators. Call $\sigma \subset Z^6$ a basis subset if the collection $\{\omega_{n_X m_X k_X} \oplus \omega_{n_Y m_Y k_Y} : (n_X, m_X, k_X, n_Y, m_Y, k_Y) \in \sigma\}$ forms a Hilbert basis. Such two-dimensional basis subsets are characterized in [W2].

Ordering wave packets. Wave packet $\omega_{nmk}$ can be totally ordered. We say that $\omega < \omega'$ if $(m, n, k) < (m', n', k')$. The triplets are compared lexicographically, counting the scale parameter m as most significant.

Tensor products of wave packets inherit this total order. Write $\omega_X = \omega_{n_X m_X k_X}$, etc. Then we will say that $\omega_X \otimes \omega_Y < \omega_{X'} \otimes \omega_{Y'}$ if $\omega_X < \omega_{X'}$ or else if $\omega_X = \omega_{X'}$ but $\omega_Y < \omega_{Y'}$. This is equivalent to $(m_X, n_X, k_X, m_Y, n_Y, k_Y) < (m_{X'}, n_{X'}, k_{X'}, m_{Y'}, n_{Y'}, k_{Y'})$ comparing lexicographically from left to right.

Projections. Let $\mathcal{W}^1$ denote the space of bounded sequences indexed by the three wave packet indices n, m, k. With the ordering above, we obtain a natural isomorphism between $l^\infty$ and $\mathcal{W}^1$. There is also a natural injection $J^1: L^2(R) \to \mathcal{W}^1$ given by $c_{nmk} = <\nu, \omega_{nmk}>$, for $\nu \in L^2(R)$ and $\omega_{nmk} \in (R)$. If $\sigma$ is a basis subset, then the composition $J_\sigma^1$ of $J^1$ with projection onto the subsequences indexed by $\sigma$ is also injective.

We also have a map $R^1: \mathcal{W}^1 \to L^2(R)$ defined by $R^1 c(t) = \Sigma_{(n,m,k) \in Z^3} c_{nmk} \omega_{nmk}(t)$. This map is defined and bounded on the closed subspace of $\mathcal{W}^1$ isomorphic to $l^2 \cap l^\infty$ under the natural isomorphism mentioned above. In particular, $R^1$ is defined and bounded on the range of $J_\sigma^1$ for every basis subset $\sigma$. The related restriction $R_\sigma^1: \mathcal{W}^1 \to L^2(R)$ defined by $R_\sigma^1 c(t) = \Sigma_{(n,m,k)} {}_\sigma c_{nmk} \omega_{nmk}(t)$ is a left inverse for $J^1$ and $J_\sigma^1$. In addition, $J^1 R_\sigma^1$ is an orthogonal projection of $\mathcal{W}^1$. Likewise, if $\Sigma_i \alpha_i = 1$ and $R_{\sigma_i}^1$ is one of the above maps for each i, then $J^1 \Sigma_i \alpha_i R_{\sigma_i}^1$ is also an orthogonal projection of $W^1$.

Similarly, writing $\mathcal{W}^2$ for $\mathcal{W}^1 \times \mathcal{W}^1$, the ordering of tensor products gives a natural isomorphism between $l^\infty$ and $\mathcal{W}^2$. The space $L^2(R^2)$, i.e. the Hilbert-Schmidt operators, inject into this sequence space $\mathcal{W}^2$ in the obvious way, namely $M \mapsto <M, \omega_{n_X m_X k_X} \otimes \omega_{n_Y m_Y k_Y}>$. Call this injection $J^2$. If $\sigma$ is a basis subset of $\mathcal{W}^2$, then the composition $J_\sigma^2$ of $J^2$ with projection onto subsequences indexed by $\sigma$ is also injective.

The map $R^2: \mathcal{W}^2 \to L^2(R^2)$ defined by $R^2 c(x,y) = \Sigma c_{X,Y} \omega_X(x) \omega_Y(y)$, is defined and bounded on that subset of $\mathcal{W}^2$ naturally isomorphic to $l^\infty \cap l^2$. In particular, it is bounded on the range of $J_\sigma^2$ for every basis subset $\sigma$.

We may also define the restrictions $R_\sigma^2$ of $R^2$ to subsequences indexed by $\sigma$, defined by $R_\sigma^2 c(x,y) = \Sigma_{(\omega_X, \omega_Y) \in \sigma} c_{X,Y} \omega_X(x) \omega_Y(y)$. There is one for each basis subset $\sigma$ of $\mathcal{W}^2$. Then $R_\sigma^2$ is a left inverse of $J^2$ and $J_\sigma^2$, and $J^2 R_\sigma^2$ is an orthogonal projection of $\mathcal{W}^2$. As before, if $\Sigma_i \alpha_i = 1$ and $\sigma_i$ is a basis subset for each i, then $J^2 \Sigma_i R_{\sigma_i}^2$ is also an orthogonal projection of $\mathcal{W}^2$.

Applying operators to vectors. For definiteness, let X and Y be two named copies of R. Let $\nu \in L^2(X)$ be a vector, whose coordinates with respect to wave packets form the sequence $J^1 \nu = \{<\nu, \omega_X>: \omega_X \in \mathcal{W}(X)\}$.

Let $M: L^2(X) \to L^2(Y)$ be a Hilbert-Schmidt operator. Its matrix coefficients with respect to the complete set of tensor products of wave packets form the sequence $J^2 M = \{<M, \omega_X \otimes \omega_Y>: \omega_X \in \mathcal{W}(X), \omega_Y \in \mathcal{W}(Y)\}$. We obtain the identity $$<M\nu, w_Y> = \sum_{w_X \in \mathcal{W}(X)} <M, w_X \otimes w_Y><\nu, w_X>$$

This identity generalizes to a linear action of $^2$ on $^1$ defined by $$c(\nu)_{nmk} = \sum_{(n'm'k')} c_{nmkn'm'k'} \nu_{n'm'k'}.$$

Now, images of operators form a proper submanifold of $\mathcal{W}^2$. Likewise, images of vectors form a submanifold $\mathcal{W}^1$. We can lift the action of M on $\nu$ to these larger spaces via the commutative diagram $$\begin{array}{ccc} \mathcal{W}^1 & \xrightarrow{J_\sigma^2 M} & \mathcal{W}^1 \\ J^1 \uparrow & & \downarrow R^1 \\ L^2(R) & \xrightarrow{M} & L^2(R) \end{array}$$

The significance of this lift is that by a suitable choice of $\sigma$ we can reduce the complexity of the map $J_\sigma^2 M$, and therefore the complexity of the operator application.

Composing operators. Let X, Y, Z be three named copies of R. Suppose that $M: L^2(X) \to L^2(Y)$ and $N: L^2(Y) \to L^2(Z)$ are Hilbert-Schmidt operators. We have the identity $$<NM, w_X \otimes w_Z> = \sum_{w_Y \in \mathcal{W}(Y)} <N, w_Y \otimes w_Z><M, w_X \otimes w_Y>.$$

This generalizes to an action of $\mathcal{W}^2$ on $\mathcal{W}^2$, which is defined by the formula $$c(d)_{nmkn'm'k'} = \sum_{n''m''k''} d_{nmkn''m''k''} c_{n''m''k'n'm'k'},$$

where c and d are sequences in $\mathcal{W}^2$. Using $J^2$, we can lift multiplication by N to an action on these larger spaces via the commutative diagram $$\begin{array}{ccc} \mathcal{W}^2 & \xrightarrow{J_\sigma^2 N} & \mathcal{W}^2 \\ J^2 \uparrow & & \downarrow R^2 \\ L^2(R^2) & \xrightarrow{N} & L^2(R^2) \end{array}$$

Again, by a suitable choice of $\sigma$ the complexity of the operation may be reduced to below that of ordinary operator composition.

Operation counts: transforming a vector. Suppose that M is a non-sparse operator of rank r. Ordinary multiplication of a vector by M takes at least $O(r^2)$ operations, with the minimum achievable only by representing M as a matrix with respect to the bases of its r-dimensional domain and range.

On the other hand, the injection $J^2$ will require $O(r^2 [\log r]^2)$ operations, and each of $J^1$ and $R^1$ require $O(r \log r)$ operations. For a fixed basis subset $\sigma$ of $\mathcal{W}^2$, the application of $J_\sigma^2 M$ to $J^1 \nu$ requires at most $\#|J_\sigma^2 M|$ operations, where $\#|U|$ denotes the number of nonzero coefficients in U. We may choose out wavelet library so that $\#|J_\sigma^2 M| = O(r^2)$. Thus the multiplication method described above costs an initial investment of $O(r^2 [\log r]^2)$, plus at most an additional $O(r^2)$ per right-hand side. Thus the method has asymptotic complexity $O(r^2)$ per vector in its exact form, as expected for which is essentially multiplication by a conjugated matrix.

We can obtain lower complexity if we take into account the finite accuracy of our calculation. Given a fixed matrix of coefficients C, write $C_\delta$ for the same matrix with all coefficients set to 0 whose absolute values are less than $\delta$. By the continuity of the Hilbert-Schmidt norm, for every $\epsilon > 0$ there is a $\delta > 0$ such that $\|C - C_\delta\|_{HS} < \epsilon$. Given M and $\epsilon$ as well as a library of wave packets, we can choose a basis subset $\sigma \subset \mathcal{W}^2$ so as to minimize $\#|(J_\sigma^2 M)_\delta|$. The choice algorithm has complexity $O(r^2 [\log r]^2)$, as shown in [W2]. For a certain class of operators, there is a library of wave packets such that for every fixed $\delta > 0$ we have (S) $\quad \#|(J_\sigma^2 M)_\delta| = O(r \log r),$ with the constant depending, of course, on $\delta$. We will characterize this class, give examples of members, and find useful sufficient conditions for membership in it. For the moment, call this class with property S the sparsifiable Hilbert-Schmidt operators $S$. By the estimate above, finite-precision multiplication by sparsifiable rank-r operators has asymptotic complexity $O(r \log r)$.

Operation counts: composing two operators. Suppose that M and N are rank-r operators. Standard multiplication of N and M has complexity $O(r^3)$. The complexity of injecting N and M into $\mathcal{W}^2$ is $O(r^2[\log r]^2)$. The action of $J_\sigma^2 N$ on $J^2 M$ has complexity $O(\Sigma_{nmk} \# |J_\sigma^2 N_{YZ}: (n_Y, m_Y, k_Y) = (n, m, k)| \# |J^2 M_{XY}: (n_Y, m_Y, k_Y) = (n, m, k)|)$. The second factor is a constant $r \log r$, while the first when summed over all nmk is exactly $\#|J_\sigma^2 N|$. Thus the complexity of the nonstandard multiplication algorithm, including the conjugation into the basis set $\sigma$, is $O(\#|J_\sigma^2 N| r \log r)$. Since the first factor is $r^2$ in general, the complexity of the exact algorithm is $O(r^3 \log r)$ for generic matrices, reflecting the extra cost of conjugating into the basis set $\sigma$.

For the approximate algorithm, the complexity is $O(\#|(J_\sigma^2 N)_\delta| r \log r)$. For the sparsifiable matrices, this can be reduced by a suitable choice of $\sigma$ to a complexity of $O(r^2[\log r]^2)$ for the complete algorithm. Since evaluating $J_\sigma^2$ has this complexity, it is not possible to do any better by this method.

REFERENCES

[CW]—Appendix II
[W2]—Appendix V

APPENDIX IV

Entropy of a Vector Relative to a Decomposition

Let $v \in H$ $\|v\| = 1$ and assume $$H = \oplus \Sigma H_i$$

an orthogonal direct sum. We define $$\epsilon^2(v, \{H_i\}) = -\Sigma \|v_i\|^2 \ln \|v_i\|^2$$

as a measure of distance between $v$ and the orthogonal decomposition.

$\epsilon^2$ is characterized by the Shannon equation which is a version of Pythagoras' theorem.

Let $$H = \oplus(\Sigma H^i) \oplus (\Sigma H_j)$$
$$= H_+ \oplus H_-$$

$H^i$ and $H_j$ give orthogonal decomposition $H_+ = \Sigma H^i$ $H_- = \Sigma H_j$. Then $$\epsilon^2(v; \{h^i, h_j\}) = \epsilon^2(v, \{H_+, H_-\}) +$$

$$\|v_+\|^2 \epsilon^2 \left( \frac{v_+}{\|v_+\|}, \{H^i\} \right) + \|v_-\|^2 \epsilon^2 \left( \frac{v_-}{\|v_-\|}, \{H_j\} \right)$$

This is Shannon's equation for entropy (if we interpret as in quantum mechanics $\|P_{H_+} v\|^2$ as the "probability" of $v$ to be in the subspace $H_+$).

This equation enables us to search for a smallest entropy space decomposition of a given vector. We need the following $H = H_1 \oplus H_2$.

$$H_1 = \oplus \Sigma H^i = \oplus \Sigma K^j.$$

$H_1$ has two decompositions in $H^i$ or $K_j$.

LEMMA 1. Let $v \in H$ with $\|v\|$ and $$v_1 = P_{H_1} v \quad v_1' = \frac{v_1}{\|v_1\|}$$

Assume also that $\epsilon^2(v_1', \{H^i\}) < \epsilon^2(v_1', \{K^i\})$ then, if $H_2 = \oplus \Sigma L^j$ we have $$\epsilon^2(v, \{H^i, L^j\}) < \epsilon^2(v, \{K^j, L^j\})$$

PROOF: By Shannon's equation $$\epsilon^2(v, \{H^i, L^j\}) = \epsilon^2(v, \{H_1, H_2\}) + \|v_1\|^2 \epsilon^2(v_1', \{H^i\}) +$$
$$\|v_2\|^2 \epsilon^2(v_2', \{L^2\}) < \epsilon^2(v, \{H_1, H_2\}) + \|v_1\|^2 \epsilon^2(v_1', \{K^j\}) +$$
$$\|v_2\|^2 \epsilon^2(v_2', \{L^j\}) = \epsilon^2(v, \{K^j, L^j\}).$$

COROLLARY. Assume $\epsilon^2(v_1', \{H^i\})$ is the smallest entropy obtained for some collection of decompositins of $H_1$ and similarly, $\epsilon^2(v_2', \{L^j\})$ is minimal. Then $\epsilon^2(v; \{H^i, L^j\})$ is minimal for the direct sum of these collections.

We consider the following generic example on $L^2(R_+)$.

Let I denote a dyadic interval of the form $(2^j k, 2^j(k+1)]$, $j \geq 0$ $k \geq 0$, and $\{I_\alpha\}$ a disjoint cover over $(0, \infty)$ consisting of dyadic intervals. We let $H_{I\alpha} = L^2(I_\alpha)$ on which we chose an orthonormal basis $\{e_{\alpha,k}^{I\alpha}\}$ $\alpha$ fixed (say trig polynomials $$\exp \left( 2\pi i \frac{x}{2^j} \right) \chi_{I_\alpha}(x).)$$

and consider $\{e_{\alpha,k}^{I\alpha}\}$ as an orthonormal basis of $L^2(R^+)$. Thus $$L^2(R^+ = \Sigma H_{I\alpha} = \sum_\alpha \sum_k \{e_{\alpha,k}\}$$

Given a vector $v$ we wish to find $I_\alpha$ such that $\epsilon^2(v, \{e_{\alpha,k}\})$ is minimal. In order to find $I_\alpha$ we use a stopping time argument. Starting with intervals of length one $I_l = (l, l+1]$. We pick a dyadic interval of length two which contains halves $I_1 I_2$ of length one, i.e. $J = I_1 \cup I_2$. We compart $$\epsilon^2(v \times J, \{e_k^J\}) \text{ with } \epsilon^2(v \times J, \{e_k^{I_1}\}\{e_k^{I_2}\})$$

and pick the basis given the smallest entropy leading to a cover of $L^2(R)$ by intervals of length one and two. We now consider dyadic intervals K of length 4 and compare $$\epsilon^2(v \times K\{e_j^K\}) \text{ and } \epsilon^2(v \times K; \{e_K^{I\alpha}\})$$

where $I_\alpha$ form a cover of K by dyadic intervals of length one or two selected previously to minimize $\epsilon^2$ on each half of K.

(If the vector function $\nu$ has bounded support we restrict our attention only to dyadic intervals contained in the smallest dyadic interval containing the support of $\nu$) and continue this procedure up to this largest scale. We claim that the final partition $I_\alpha$ and corresponding basis provides the minimal entropy decomposition. In fact, this is an immediate consequence of Lemma 1 which shows that given the optimal minimum entropy partition any refinement corresponds to worse entropy.

APPENDIX V

Higher-Dimensional Best Basis Selection

Introduction. We introduce a method of coding by orthogonal functions which may be used to compress digitized pictures or sequences of pictures, matrices and linear operators, and general sampled functions of several variables. The method selects a most efficient orthogonal representation from among a large number of possibilities. The efficiency functional need only be additive across direct sum decompositions. We present a description of the method for pictures, namely functions of two variables, using Shannon entropy as the efficiency functional, and mean-square deviation as the error criterion.

Best basis method. In Appendix II is developed a method for generating a library of orthogonal vectors in $R^n$ (for large n) together with a notion of admissible subsets of these vectors. Admissible subsets form orthonormal bases of wavelet-packets, which because of their homogeneous tree structure may be rapidly searched for functional extrema. We can use a family of orthonormal vectors well suited to representing functions of 2 variables. These are products of quadrature mirror filters, as defined below:

Let $\{p_k\}$, $\{q_k\}$ belong to $l^1$, and define two decimating convolution operators $P : l^2 \rightarrow l^2$, $Q : l^2 \rightarrow l^2$ as follows:

$$Pf_k = \sum_{j=-\infty}^{\infty} p_j f_{j+2k}, \quad Qf_k = \sum_{j=-\infty}^{\infty} q_j f_{j+2k}.$$

P and Q are called quadrature mirror filters if they satisfy an orthogonality condition:

$$PQ^* = QP^* = 0,$$

where $P^*$ denotes the adjoint of P, and $Q^*$ the adjoint of Q. They are further called perfect reconstruction filters if they satisfy the condition $$P^*P + Q^*Q = I,$$

where I is the identity operator. These conditions translate to restrictions on the sequences $\{p_k\}$, $\{q_k\}$. Let $m_0$, $m_1$ be (bounded) functions defined by $$m_0(\xi) = \sum_{k=-\infty}^{\infty} p_k e^{ik\xi}, \quad m_1(\xi) = \sum_{k=-\infty}^{\infty} q_k e^{ik\xi}.$$

Then P, Q are quadrature mirror filters if and only if the matrix below is unitary for all $\xi$:

$$\begin{pmatrix} m_0(\xi) & m_0(\xi + \pi) \\ m_1(\xi) & m_1(\xi + \pi) \end{pmatrix}$$

This fact is proved in [D].

Now we can define a number of orthogonal 2-dimensional convolution-decimation filters in terms of P and Q. Four of them are simply tensor products of the pair of quadrature mirror filters, as in the construction of 2-dimensional wavelets of Meyer [M].

$$F_0 \stackrel{def}{=} P \otimes P, \quad F_0 v(x,y) = \sum_{i,j} v(i,j) p_{2x+i} p_{2y+j}$$

$$F_1 \stackrel{def}{=} P \otimes Q, \quad F_1 v(x,y) = \sum_{i,j} v(i,j) p_{2x+i} q_{2y+j}$$

$$F_2 \stackrel{def}{=} Q \otimes P, \quad F_2 v(x,y) = \sum_{i,j} v(i,j) q_{2x+i} p_{2y+j}$$

$$F_3 \stackrel{def}{=} Q \otimes Q, \quad F_3 v(x,y) = \sum_{i,j} v(i,j) q_{2x+i} q_{2y+j}$$

There are also pairs of extensions of one dimensional filters:

$$P_Y \stackrel{def}{=} I \otimes P, \quad P_Y v(x,y) = \sum_{i,j} v(i,j) \delta_{x,i} p_{2y+j} = \sum_j v(x,j) p_{2y+j}$$

$$Q_Y \stackrel{def}{=} I \otimes Q, \quad Q_Y v(x,y) = \sum_{i,j} v(i,j) \delta_{x,i} q_{2y+j} = \sum_j v(x,j) q_{2y+j}$$

$$P_X \stackrel{def}{=} P \otimes I, \quad P_X v(x,y) = \sum_{i,j} v(i,j) p_{2x+i} \delta_{y,j} = \sum_i v(i,y) p_{2x+i}$$

$$Q_X \stackrel{def}{=} Q \otimes I, \quad Q_X v(x,y) = \sum_{i,j} v(i,j) q_{2x+i} \delta_{y,j} = \sum_i v(i,y) q_{2x+i}$$

These convolution-decimations have the following adjoints:

$$F_0^* v(x,y) = \sum_{i,j} v(i,j) p_{2i+x} p_{2j+y}$$

$$F_1^* v(x,y) = \sum_{i,j} v(i,j) p_{2i+x} q_{2j+y}$$

$$F_2^* v(x,y) = \sum_{i,j} v(i,j) q_{2i+x} p_{2j+y}$$

$$F_3^* v(x,y) = \sum_{i,j} v(i,j) p_{2i+x} p_{2j+y}$$

$$P_Y^* v(x,y) = \sum_{i,j} v(i,j) \delta_{x,i} p_{2j+y} = \sum_j v(x,j) p_{2j+y}$$

$$Q_Y^* v(x,y) = \sum_{i,j} v(i,j) \delta_{x,i} q_{2j+y} = \sum_j v(x,j) q_{2j+y}$$

$$P_X^* v(x,y) = \sum_{i,j} v(i,j) p_{2i+x} \delta_{y,j} = \sum_i v(i,y) p_{2i+x}$$

-continued $$Q_X^* v(x,y) = \sum_{i,j} v(i,j) q_{2i+x} \delta_{y,j} = \sum_i v(i,y) q_{2i+x}$$

The orthogonality relations for this collection are as follows:

$$F_n F_m^* = \delta_{nm} I$$

$$I = F_0^* F_0 \oplus F_1^* F_1 \oplus F_2^* F_2 \oplus F_3^* F_3$$

$$P_X P_X^* = P_Y P_Y^* = Q_X Q_X^* = Q_Y Q_Y^* = I$$

$$P_X Q_X^* = Q_X P_X^* = P_Y Q_Y^* = Q_Y P_Y^* = 0$$

$$I = P_X^* P_X \oplus Q_X^* Q_X = P_Y^* P_Y \oplus Q_Y^* Q_Y$$

By a "picture" we will mean any function $S = S(x,y) \in l^2(Z^2)$. The space $l^2(Z^2)$ of pictures may be decomposed into a partially ordered set $\mathbf{W}$ of subspaces $W(n_X, n_Y, m_X, m_Y)$, where $m_X \geq 0$, $m_Y \geq 0$, $0 \leq n_X < 2^{m_X}$, and $0 \leq n_Y < 2^{m_Y}$. These are the images of orthogonal projections composed of products of convolution-decimations. Put $W(0, 0, 0, 0) = l^2$, and define recursively $$W(2n_X + i, 2n_Y + j, m_X + 1, m_Y + 1) = F_{2i+j}^* F_{2i+j} W(n_X, n_Y, m_X, m_Y),$$

$$W(2n_X, n_Y, m_X + 1, m_Y) = P_X^* P_X W(n_X, n_Y, m_X, m_Y),$$

$$W(2n_X + 1, n_Y, m_X + 1, m_Y) = Q_X^* Q_X W(n_X, n_Y, m_X, m_Y),$$

$$W(n_X, 2n_Y, m_X, m_Y + 1) = P_Y^* P_Y W(n_X, n_Y, m_X, m_Y),$$

$$W(n_X, 2n_Y + 1, m_X, m_Y + 1) = Q_Y^* Q_Y W(n_X, n_Y, m_X, m_Y).$$

These subspaces may be partially ordered by a relation which we define recursively as well. We say $W$ is a precursor of $W'$ (write $W \preceq W'$) if they are equal or if $W' = G^* G W$ for a convolution-decimation $G$ in the set $\{F_0, F_1, F_2, F_3, P_X, P_Y, Q_X, Q_Y\}$. We also say that $W \preceq W'$ if there is a finite sequence $V_1, \ldots, V_n$ of subspaces in $\mathbf{W}$ such that $W \preceq V_1 \preceq \ldots \preceq V_n \preceq W'$. This is well defined, such each application of $G^*G$ increase at least one of the indices $m_X$ or $m_Y$.

While $\{\mathbf{W}, \preceq\}$ is not a tree, it may be made into a tree if we select a subset of the relation $\preceq$. We will say that $W = W(n_X, n_Y, m_X, m_Y)$ is a principal precursor of $W' = W(n_X', n_Y', m_X', m_Y')$ (and write $W \prec W'$) if one of the following holds:

(1) $m_Y = m_X$, and $W' = G^* G W$ for $G \in \{F_0, F_1, F_2, F_3, P_X, P_Y, Q_X, Q_Y\}$, or
(2) $m_Y < m_X$, and $W' = G^* G W$ for $G \in \{P_X, Q_X\}$, or
(3) $m_Y > m_X$, and $W' = G^* G W$ for $G \in \{P_Y, Q_Y\}$.

Further, we will say that $W \prec W'$ if there is a finite sequence $V_0, \ldots, V_n$ of subspaces in $\mathbf{W}$ with $W \prec V_0 \prec \ldots \prec V_n \prec W'$. The relation $\prec$ is well defined, since it is a subrelation of $\preceq$, and it is not hard to see that every subspace $W \in \mathbf{W}$ has a unique first principal precursor.

Therefore, $\{\mathbf{W}, \prec\}$ forms a (nonhomogeneous) tree, with $W(0, 0, 0, 0)$ at its root.

Subspaces of a single principal precursor $W \in \mathbf{W}$ will be called its children. By the orthogonality condition, (F) $\quad W = F_0^* F_0 W \oplus F_1^* F_1 W \oplus F_2^* F_2 W \oplus F_3^* F_3 W$ (X) $\quad\quad = P_X^* P_X W \oplus Q_X^* Q_X W$ (Y) $\quad\quad = P_Y^* P_Y W \oplus Q_Y^* Q_Y W.$ The right hand side contains all the children of $W$, divided into the groups "F," "X," and "Y." Each labelled group of children provides a one-step orthogonal decomposition of $W$, and in general we will have three subsets of the children to choose from.

The coordinates with respect to the standard basis of $W(n_X, n_Y, m_X, m_Y)$ form the sequence $G_1 \ldots G_m W(0, 0, 0, 0)$, where $m = \max\{m_X, m_Y\}$, and the particular filters $G_1 \ldots G_m$ are determined uniquely by $n_X$ and $n_Y$. This is described in Appendix II, attached hereto. Therefore we can express in standard coordinates the orthogonal projections of $W(0, 0, 0, 0)$ onto the complete tree of subspaces $\mathbf{W}$ by recursively convolving and decimating with the filters.

Relation with one-dimensional wave packets. Let $\omega_{nmk}$ be a one-dimensional wave packet at sequency $n$, scale $m$ and position $k$, in the notation of Appendix II. Then the element in the $(k_X, k_Y)$ position of the subspace $W(n_X, n_Y, m_X, m_Y)$, at the index $(x, y)$, may be written as $\omega_{n_X, m_X, k_X}(x) \omega_{n_Y, m_Y, k_Y}(y)$, which is evidently the tensor product of two one-dimensional wave packets. This is easily seen from the construction of $W(n_X, n_Y, m_X, m_Y)$: in the x-direction, there will be a total of $m_X$ convolution-decimations in the order determined by $n_X$, with the result translated to position $k_X$, and similarly in the y-direction.

We will use the notation $\omega \otimes \nu$ for the tensor product of two one-dimensional wave packets, with the understanding that the second factor depends on the y-coordinate. Since the one-dimensional wave packets are themselves a redundant spanning set, their tensor products contain a redundancy of bases for $l^2 R^2$. We can search this collection of bases efficiently for a best-adapted basis, using any additive measure of information, in a manner only slightly more complicated than for the one-dimensional case.

Selecting a best basis. Let $S = S(x, y)$ be a picture, and let $\mathbf{W}$ be a tree of wavelet packets. Choose an additive measure of information as described in Appendix II, and attribute to each node $W(n_X, n_Y, m_X, m_Y)$ the measure of information contained in the coordinates of $S$ with respect to the wavelet packets it contains. For example, we may use Shannon entropy, $$\mathcal{H}(W) = \sum_{k_X, k_Y} p^2 \log p^2,$$

where $p = \langle S, \omega_{n_X m_X k_X} \otimes \omega_{n_Y m_Y k_Y}\rangle$, and $W = W(n_X, m_X, n_Y, m_Y)$. We will choose an arbitrary maximum level in the tree $\mathbf{W}$, and mark all of its nodes as "kept." Proceeding up from this level to the root, we will compare $\mathcal{H}(W)$ for a node $W$ of the tree $\mathbf{W}$ to the minimum of $\sum_{W \prec W' \in F} \mathcal{H}(W')$, $\sum_{W \prec W' \in X} \mathcal{H}(W')$, and $\sum_{W \prec W' \in Y} \mathcal{H}(W')$. If $\mathcal{H}(W)$ is less, than mark $W$ as "kept" and mark as "not kept" all nodes $W'$ with $W \prec W'$; otherwise, mark $W$ as "not kept," but attribute to it the minimum of the entropies of its children. When this procedure terminates at the root, the nodes marked "kept" will comprise an orthogonal collection of wavelet packets.

It is not necessary to mark all descendants of a "kept" parent as not kept. The complexity of the search algorithm is O(n log n) if we never change the status of descendants, but instead take for the orthogonal collection only those nodes marked "kept" which have no ancestors marked "kept." These may be listed efficiently by indexing the tree in the preorder or depth-first order.

Error estimates for the best basis. Let $\mathcal{H}(S)$ denote the entropy of the picture S in the best basis found above. This quantity will be found attributed to node (W(0, 0, 0, 0) at the end of the search. It is related to the classical Shannon entropy $\mathcal{H}_0$ by the equation $$\mathcal{H}_0(S) = \|S\|^{-2}\mathcal{H}(S) + \log \|S\|^2$$

The largest $\exp \mathcal{H}_0(S) = \|S\|^2 \exp \mathcal{H}(S)/\|S\|^2$ terms of the wavelet packet expansion for S contain essentially all the energy of the original picture. Mean square error bounds for specific classes of signals are provided in Appendix IV.

REFERENCES

[D] Ingrid Daubechies, *Orthonormal bases of compactly supported wavelets*, Communications on Pure and Applied Mathematics XLI (1988), 909–996.

[M] Yves Meyer, *De la recherche petrolière à la geometrie des espaces de Banach en passant par les paraproduits.*, Seminaire equations aux derivées partielles 1985–1986, École Polytechnique, Palaiseaux.

We claim:

1. Apparatus for encoding and decoding an input audio or video signal, comprising:
   means for converting the signal to digital form;
   a memory;
   means for applying combinations of dilations and translations of a wavelet to the digitized input signal to obtain processed values, and for storing said processed values in said memory;
   means for computing the information costs of the stored processed values;
   means for selecting, as encoded signals, an orthogonal group of stored processed values, the selection being dependent on the computed information costs;
   means for transmitting the encoded signals;
   means for receiving the transmitted encoded signals; and
   means for decoding the received encoded signals to obtain an output signal.

2. Apparatus for encoding and decoding an input audio or video signal, comprising:
   means for converting the signal to digital form;
   a memory;
   means for applying combinations of dilations and translations of the wavelet having a plurality of vanishing moments to the input signal to obtain processed values and for storing said processed values in said memory;
   means for selecting, as encoded signals, an orthogonal group of stored processed values;
   means for transmitting the encoded signals;
   means for receiving the transmitted encoded signals; and
   means for decoding the received encoded signals to obtain an output signal.

* * * * *